(12) United States Patent
Haussecker et al.

(10) Patent No.: US 8,934,683 B2
(45) Date of Patent: Jan. 13, 2015

(54) MODEL-BASED FUSION OF SCANNING PROBE MICROSCOPIC IMAGES FOR DETECTION AND IDENTIFICATION OF MOLECULAR STRUCTURES

(75) Inventors: Horst Haussecker, Palo Alto, CA (US); Andrew A. Berlin, San Jose, CA (US); Selena Chan, San Jose, CA (US); Eric Hannah, Pebble Beach, CA (US); Narayanan Sundararajan, San Francisco, CA (US); Mineo Yamakawa, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 12/359,637

(22) Filed: Jan. 26, 2009

(65) Prior Publication Data
US 2009/0262994 A1    Oct. 22, 2009

Related U.S. Application Data

(60) Division of application No. 10/685,867, filed on Oct. 14, 2003, now Pat. No. 7,606,403, which is a continuation-in-part of application No. 10/273,312, filed on Oct. 17, 2002, now abandoned.

(51) Int. Cl.
*G06K 9/00* (2006.01)
*G01Q 30/04* (2010.01)
*B82Y 35/00* (2011.01)

(52) U.S. Cl.
CPC *G01Q 30/04* (2013.01); *B82Y 35/00* (2013.01)
USPC ........................................................ 382/128

(58) Field of Classification Search
CPC ............................... G01Q 30/04; B82Y 40/00
USPC .......... 382/128, 129, 130, 131, 132, 133, 134
See application file for complete search history.

(56) References Cited

U.S. PATENT DOCUMENTS

| 4,683,195 A | 7/1987 | Mullis et al. |
| 4,683,202 A | 7/1987 | Mullis |

(Continued)

FOREIGN PATENT DOCUMENTS

| EP | 0404682 | 12/1990 |
| EP | 0732584 | 9/1996 |
| WO | WO-0161330 | 8/2001 |

OTHER PUBLICATIONS

Office Action in related Chinese Patent Application No. 200380101491.9 issued Nov. 6, 2009.

(Continued)

*Primary Examiner* — Brian Le
(74) *Attorney, Agent, or Firm* — Pillsbury Winthrop Shaw Pittman LLP

(57) ABSTRACT

In certain embodiments of the invention, a plurality of images of one or more subjects may be captured using different imaging techniques, such as different modalities of scanning probe microscopy. Parameters may be estimated from the plurality of images, using one or more models of known molecular structures to provide a model-based analysis. The estimated parameters may be fused, with further input from physical models of known molecular structures. The fused parameters may be used to characterize the subjects. Such characterization may include the detection and/or identification of specific molecular structures, such as proteins, peptides and/or nucleic acids of known sequence and/or structure. In some embodiments of the invention the structural characterizations may be used to identify previously unknown properties of a subject molecule.

14 Claims, 11 Drawing Sheets

(56) References Cited

U.S. PATENT DOCUMENTS

| | | | |
|---|---|---|---|
| 4,800,159 | A | 1/1989 | Mullis et al. |
| 5,405,766 | A | 4/1995 | Kallury et al. |
| 5,472,881 | A | 12/1995 | Beebe et al. |
| 5,497,656 | A | 3/1996 | Kado et al. |
| 5,603,872 | A | 2/1997 | Margalit et al. |
| 5,610,287 | A | 3/1997 | Nikiforov et al. |
| 5,612,181 | A | 3/1997 | Fourmentin-Guilbert et al. |
| 5,621,210 | A | 4/1997 | Lindsay |
| 5,776,674 | A | 7/1998 | Ulmer |
| 5,840,862 | A | 11/1998 | Bensimon et al. |
| 5,949,070 | A | 9/1999 | Gamble |
| 5,986,076 | A | 11/1999 | Rothschild et al. |
| 6,013,458 | A | 1/2000 | Kahn et al. |
| 6,044,221 | A | 3/2000 | Gupta et al. |
| 6,054,327 | A | 4/2000 | Bensimon et al. |
| 6,054,495 | A | 4/2000 | Markowitz et al. |
| 6,078,681 | A | 6/2000 | Silver |
| 6,127,120 | A | 10/2000 | Graham et al. |
| 6,139,831 | A | 10/2000 | Shivashankar et al. |
| 6,149,868 | A | 11/2000 | Natan et al. |
| 6,157,921 | A | 12/2000 | Barnhill |
| 6,187,823 | B1 | 2/2001 | Haddon et al. |
| 6,195,445 | B1 | 2/2001 | Dubuisson-Jolly et al. |
| 6,225,055 | B1 | 5/2001 | Bensimon et al. |
| 6,225,068 | B1 | 5/2001 | Wolfrum |
| 6,248,537 | B1 | 6/2001 | Bensimon et al. |
| 6,258,401 | B1 | 7/2001 | Crowley |
| 6,259,802 | B1 | 7/2001 | Jolly et al. |
| 6,265,153 | B1 | 7/2001 | Bensimon et al. |
| 6,280,939 | B1 | 8/2001 | Allen |
| 6,283,812 | B1 | 9/2001 | Jin et al. |
| 6,303,296 | B1 | 10/2001 | Bensimon et al. |
| 6,327,581 | B1 | 12/2001 | Platt |
| 6,344,319 | B1 | 2/2002 | Bensimon et al. |
| 6,345,235 | B1 | 2/2002 | Edgecombe et al. |
| 6,357,285 | B1 | 3/2002 | Allen |
| 6,358,375 | B1 | 3/2002 | Schwob et al. |
| 6,360,020 | B1 | 3/2002 | Panis |
| 6,396,054 | B1 | 5/2002 | Kley |
| 6,545,276 | B1 | 4/2003 | Sasaki et al. |
| 6,547,940 | B2 | 4/2003 | Aksay et al. |
| 6,689,323 | B2 | 2/2004 | Fisher et al. |
| 6,757,412 | B1* | 6/2004 | Parsons et al. ............... 382/128 |
| 6,813,393 | B2* | 11/2004 | Takeo ........................... 382/299 |
| 6,905,822 | B2 | 6/2005 | Barry, III et al. |
| 6,957,119 | B2* | 10/2005 | Peng et al. .................... 700/121 |
| 7,133,543 | B2* | 11/2006 | Verwoerd et al. ............ 382/128 |
| 7,499,806 | B2* | 3/2009 | Kermani et al. .............. 702/19 |
| 2001/0052257 | A1 | 12/2001 | Magerle |
| 2002/0013457 | A1 | 1/2002 | Suyama |
| 2002/0150909 | A1* | 10/2002 | Stuelpnagel et al. ......... 435/6 |
| 2003/0087280 | A1 | 5/2003 | Schwartz et al. |
| 2003/0138968 | A1 | 7/2003 | Fisher et al. |
| 2003/0223630 | A1* | 12/2003 | Adel et al. .................... 382/145 |
| 2004/0076996 | A1 | 4/2004 | Kondo et al. |

OTHER PUBLICATIONS

J.Y. Grand et al., "Epitaxial growth of copper phthalocyanine monolayers on Ag(111)". Surface Science. vol. 366. p. 403-414. 1996.
European Offica Action dated Nov. 21, 2006, issued in connection to corresponding European Application No. 03809156.7.
Berger & Kimmel, Guide to Molecular Cloning Techniques Academic Press, New York, NY. 1987.
Sambrook, et al., Molecular Cloning: A Laboratory Manual 2$^{nd}$ Ed. Cold Spring Harbor Press, Cold Spring Harbor, NY. 1989.
Protein Purification (1987). Scopes ed.; Springer-Verlag, New York, NY.
Methods in Molecular Biology: Protein Purification Protocols vol. 59 (1996). Doonan ed.; Humana Press, Totowa, NJ.
Creighton (1984). Proteins: Structures and Molecular Properties Ch. 5.; W.H. Freeman ed.; New York, NY.
Ramachandran et al. (1968). Adv. Protein Chem. 23:283-437.
Lee and Meisel, (1982). "Adsorption and Surface-Enhanced raman of Dyes on Silver and Gold Coils," J. Phys. Chem. 86:3391-3395.
Feldheim, "Assembly of metal nanoparticle arrays using molecular bridges," The Electrochemical Society Interface, Fall, 2001, pp. 22-25.
Parker et al., (1991). High Yield Synthesis, Separation, and Mass-Spectrometric Characterization of Fullerenes $C_{60}$ to $C_{266}$. J.A. Chem. Soc. 113:7499-7503.
Schoenfeld et al., (1995). Proc. 7th, 1st int. Conf. on Modulated Semiconductor Structures, Madrid, 605-608.
Maivald et al., (1991). "Using Force Modulation to Image Surface Elasticities with the Atomic Force Microscope, " Nanotechnology 2:103.
Chou & Fasman (1978). Adv. Enzymol.47:45-148.
Bensimon, et al., (1995). "Stretching DNA with a Receding Meniscus: Experiments and Models," Physical Review Letters 74(23):4754-4757.
Michalet et al., (1997). "Dynamic Molecular Combing: Stretching the Whole Human Genome for High-Resolution Studies," Science 277:1518-1523.
Herrick et al., (2000). "Ouantifying Single Genre Copy Number by Measuring Fluorescent Probe Lengths on Combed Genomic DNA," *PNAS* 97(1 ):222-227.
Kotler et al. (1993). "ONA Sequencing: Modular Primers Assembled from a Library of Hexamers or Pentamers," *Proc. Natl. Acad. Sci. 90:4241-4245.*
Kaczorowski et al. (1996) "Co-Operativity of Hexamer Litigation," *Gene 17:189-193.*
Holmstrom et al. (1993). "A Highly Sensitive and Fast Nonradioactive Method for Detection of Polymerase Chain Reaction Products," *Anal. Biochem. 209:278-283.*
Running et al., (1990). Procedure for Productive Coupling of Synthetic.
Newton et al. (1993). The Production of PCR Products with 5' Single-Stranded Tails Using Primers That Incorporate Novel Phosphoramidite Intermediates,• *Nucleic Acids Res.* 21 (5):1155-1162.
Rasmussen et at (1991). "Covalent ImmObilization of DNA onto Polystyrene Microwells: The Molecules Are Only Bound at the 5' End," *Anal. Biochem. 198:138-142.*
Han et al. (2001). auantun-Dot-Tagged Microbeads for Multiplexed Optical Coding of Biomolecules,• *Nature Biotech. 19:631-635.*
Cunin et al. (2002). Biomolecular Screening with Encoded Porous-Silicon Photonic Crystals,• *Nature Materials* 1:39-41.
Hansma et al. (1996). DNA Binding to Mica Correlates with Cationic Radius: Assay by Atomic Force Microscopy,• *Biophys J. 70:1933.*
Lyubchenko et al., (1997). "Visualization of Supercoiled DNA with Atomic Force Microscopy in Situ," PNAS 94:496-501.
Kasas et al. (1997). "*Escherichia coli* RNA Polymerase Activity Observed Using Atomic Force Microscopy," *Biochemistry 36:461.*
Anderson et al. (2000). "Fabrication of Topologically Complex Three-Dimensional Microfluidic Systems in PDMS by Rapid Prototyping," Anal. Chem. 72:3158.3164.
Oligonucleotides to Polystyrene Microtiter Wells for Hybridization Capture, *BioTechniques 8(3):279-277.*
Ando, et al., "A High-Speed Atomic Force Microscope for Studying Biological Macromolecules," *PNAS*, vol. 98, No. 22, pp. 12468-12472, Oct. 2001.
Clauss, et al., "Atomic Resolution STM Imaging of a Twisted Single-Wall Carbon Nanotube," *Physical Review B*, vol. 58, No. 8, pp. 4266-4269, Aug. 1998.
Clauss, et al., "Electron Backscattering on Single-Wall Carbon Nanotubes Observed by Scanning Tunneling Microscopy," *Europhys. Lett..*, 47(5), pp. 601-607, 1999.
Freitag, et al., "Local Electronic Properties of Single-Wall Nanotube Circuits Measured by Conducting-Tip AFM," *Physical Review B*, vol. 62, No. 4, pp. 2307-2310, Jul. 2000.
Frisbie, et al, "Functional Group Imaging by Chemical Force Microscopy," *Science*, vol. 265, pp. 2071-2074 Sep. 1994.
Hansma, et al., Atomic Force Microscopy of DNA in Aqueous Solutions, *Nucleic Acids Res:*, 21 :505-512, 1993.

(56) References Cited

OTHER PUBLICATIONS

Hirahara, et al., "One-Dimensional MetallofuUerene Crystal Generated Inside Single-Walled Carbon Nanotubes," *Physical Review Letters*, vol. 85, No. 25, pp. 5384-5387, Dec. 2000.

Huang, et al., "Directed Assembly of One-Dimensional Nanostructures into Functional Networks," *Science*, vol. 291, pp. 630-633, Jan. 2001.

Klein, et al., "Ordered Stretching of Single Molecules of Deoxyribose Nucleic Acid Between Microfabricated Polystyrene Lines," *Applied Physics Letters*, vol. 78, No. 16, pp. 2396-2398, Apr. 2001.

Kim, et al., "AFM Study of Surface Phenomena Based on $C_{60}$ Film Growth," *Applied Surface Science*, 130-132 pp. 602-609, 1998.

Kobayashi, et al, "Imaging of Fullerene Molecules on Si(111)-7 7 Surface with NC-AFM." *App/ied Surface Science*, 157. pp. 228-232. 2000.

Moller, et al, "Tapping-Mode Atomic Force Microscopy Produces Faithful High-Resolution Images of Protein Surfaces," *Biophys. J.*, 77: 1150-8, 1999.

Murray, et al., "Atomic Force Microscopy of Biochemically Tagged DNA" *Proc. Natl. Acad. Sci. USA*, 90:3811-4, 1993.

Nicewarmer-Pena, "Submicrometer Metallic Barcodes," *Science*, vol. 294, pp. 137-141, Oct. 2001.

Doom, et al., "Single-Walled Carbon Nanotubes," *Ann. N. Y. Acad. Sci.*, 960:203-215, (2002). Retrieved from the Internet on Jul. 2, 2002, URL://<http://annalsnyas.org/cgi/content/full/960/1/203> 10 pages.

Thundat, et al., "Atomic Force Microscopy of DNA on Mice and Chemically Modified Mica," *Scanniml Microsc.* 6:911-8, 1992.

Uchihashi, et al, "Application ofNoncontact-Mode Atomic Force Microscopy to Molecular Imaging," Retrieved from the Internet on Jul. 3, 2002,URL://<http://www.foresight.org/Conferences/MNT7/Abstracts/Uchihashi/> 2 pages.

English language Japanese Office Action corresponding to JP Application No. 2004-545510, dated Sep. 14, 2010.

Zhang, et al. "Scanning Tunneling Microscopy of the Ultrastructure of Native Cellulose"; Acta Biophysica Sinica, vol. 13, No. 3, Sep. 30, 1997, pp. 375-379.

Zhang, et al. "Scanning Tunneling Microscopy of the Ultrastructure of Native Cellulose"; Acta Biophysica Sinica, vol. 13:3, Sep. 30, 1997.

Yu, et al. "Deoxyribonucleic Acid Sample Preparation in Scanning Probe Microscope"; Chinese Journal of Analytical Chemistry, vol. 29:12, pp. 1470-1477; Dec. 31, 2001.

Chinese Office Action with English translation corresponding to Chinese Application No. 200380101491.9, dated Sep. 23, 2011, 12 pages.

\* cited by examiner

*FIG. 10*

```
         A
PT1 TTGGGTACACTTACCTGGTACCCCACCCGGAGTTAGGGGC (SEQ ID NO:1)
      A'             B
PT2 GCCCCTAACTGTGGAAAATCGATGGCCCGGCCGCTCTTATGGTTGCTGACTAGACCA (SEQ ID NO:2)
                   B'                                        C
PT3 TGGTCTAGTCAGCAACCATAAGAAGTACTCTCGAGAAGCTTTTGAATTCTTTGGATCCATGGGGCGGAG (SEQ ID
    NO:3)
           C'                         D
PT4 CTCCGCCCCACTAGTGTCGACCTGCAGGCGCGCGAGCTCCAATGGGCGGACAATGGCACA (SEQ ID NO:4)
                D'                    E
PT5 TGTGCCATTGTCCGCCCATTAGCTTTTGTTCCCTTAGTGAGGGTTAATTTCGAGCTTGGATTGAGAATGC (SEQ ID NO:5)
                       E'                      F
PT6 GCATTCAATGTAATCAAGGTCATAGCTGTCTGTTTCCTGTGTTTGCATACTTCTGCCATTCG (SEQ ID NO:6)
                 F'                  G
PT7 CGAATGGCAGAAGTATGCAAGAAAATTGTTATCCGCTCACAATTCCACACAATATGCGAGCTGCTGGGGAG (SEQ ID NO:7)
             G'                        H
PT8 CTCCCCAGCAGCGGAAGTATAAAGTTAAAGCCTGGGGTGCGGATGGGCGAATGAGACTG (SEQ ID NO:8)
            H'
PT9 ACAGTCTCATTCGCCCATCCCTAATGAGTGAGCTAACTCACAGTAATTGCGGCTAGCGGA (SEQ ID NO:9)
```

MODEL-BASED FUSION OF SCANNING PROBE MICROSCOPIC IMAGES FOR DETECTION AND IDENTIFICATION OF MOLECULAR STRUCTURES

RELATED APPLICATIONS

The present application is a divisional of U.S. patent application Ser. No. 10/685,867, filed Oct. 14, 2003, which is a continuation-in-part of U.S. patent application Ser. No. 10/273,312, filed Oct. 17, 2002 (now abandoned).

BACKGROUND

1. Field

The present application relates to imaging in general, and more specifically to model-based fusion of images. Certain disclosed methods concern structure determination, including structures of biomolecules, such as proteins, peptides, lipids, polysaccharides and/or nucleic acids.

2. Related Art

In various forms of imaging technology, such as scanning probe microscopy (SPM), different sensing modalities may be used to image a particular subject. In conventional methods, each image may be interpreted individually, with only qualitative cross-referencing of various common features of the images. In SPM, the images are generally interpreted by visual observation. Interpretation of images may be time consuming and inefficient when a large amount of data must be interpreted, such as identifying one or more specific molecular structures in various samples. Cross-referencing of structural features in images captured by different scanning probe modalities, such as atomic force microscopy (AFM), scanning tunneling microscopy (STM), and/or magnetic force microscopy (MFM) is very slow and is subject to operator error or interpretation.

In determining whether a known subject is present in a sample, different sensing modalities used to image a sample are generally not combined to provide a fused image of the same region of the sample. Where multiple images of a sample are combined, this is typically accomplished by combining the different data sets on a point-by-point or pixel-by-pixel basis. However, the combination of images does not fully exploit the mutually independent information that is available in different images. Further, the combination of images on a point-by-point or pixel-by-pixel basis requires a precise alignment of the individual images to create a multi-feature image on the same grid. Such alignment is extremely difficult for SPM images of structures on a nanometer-scale, in the absence of known calibration landmarks for alignment. A need exists for methods of image fusion that utilize known structural characteristics of biomolecules to assist in identification and analysis of SPM images.

BRIEF DESCRIPTION OF THE DRAWINGS

The following drawings form part of the specification and are included to further illustrate the disclosed methods and apparatus. The methods and apparatus may be better understood by reference to one or more of these drawings in combination with the detailed description presented herein.

FIG. 10 lists the complete sequences of PT1 through PT9, including the branch points.

DETAILED DESCRIPTION OF ILLUSTRATIVE EMBODIMENTS

Definitions

Figure 1:
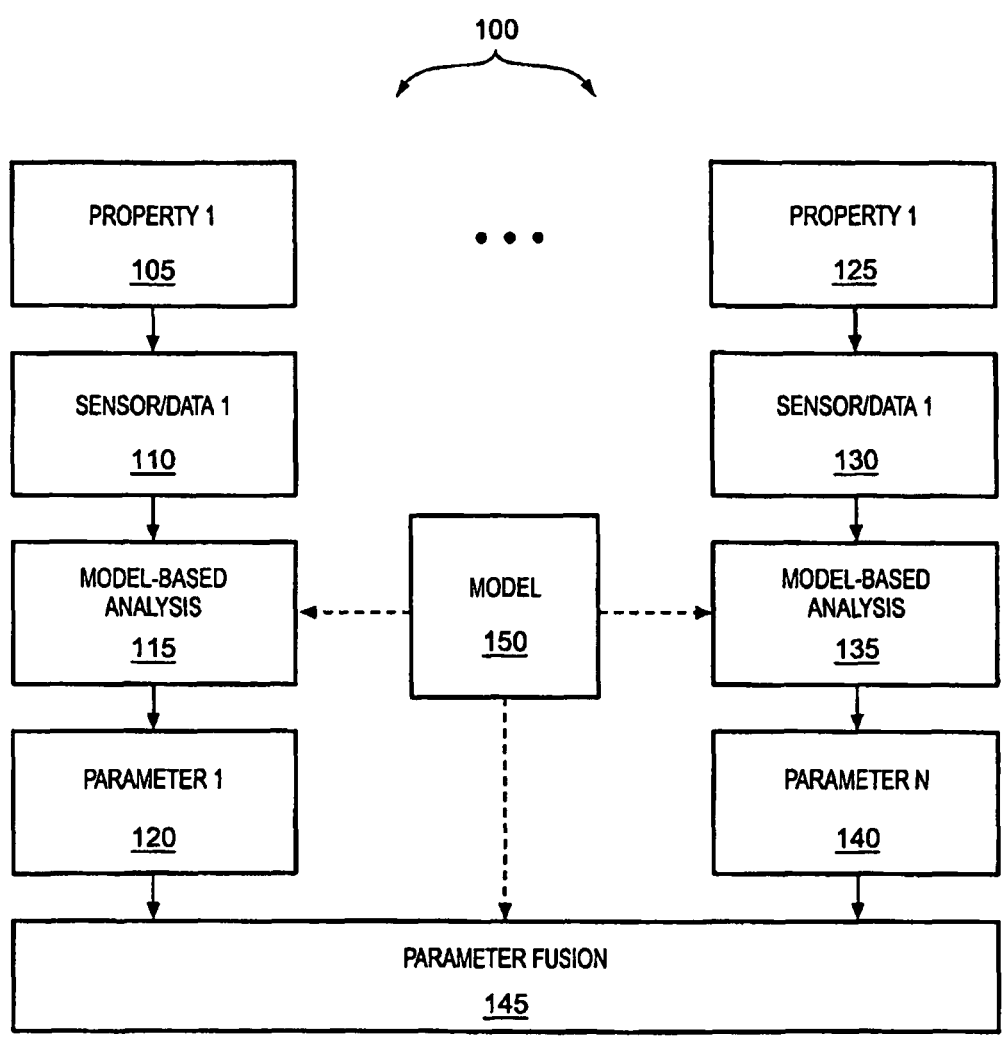
FIG. 1 illustrates an exemplary method of model-based fusion of image parameters

As used herein, "a" and "an" may mean one or more than one of an item.

As used herein, a "subject" may be any object that can be imaged by SPM technology, including but not limited to biomolecules. The skilled artisan will understand that a biomolecule may refer to any molecule found in biological systems, including but not limited to proteins, polypeptides, peptides, glycoproteins, lipoproteins, lipids, polysaccharides, glycolipids, lipopolysaccharides, oligonucleotides, polynucleotides, nucleic acids and nucleoproteins. "Subjects" are not limited to single molecules but may also encompass complexes of two or more molecules.

"Nucleic acid" includes deoxyribonucleic acids (DNA), ribonucleic acids (RNA), single-stranded, double-stranded or triple stranded and any chemical modifications thereof. "Nucleic acids" may be of any length, from two bases in size up to a full-length chromosome. Virtually any covalent or non-covalent modification of a nucleic acid is contemplated within the scope of the claimed subject matter. "Nucleic acids" include, but are not limited to, oligonucleotides and polynucleotides.

"Protein" refers to polymeric molecules, of any length, assembled from amino acids. "Proteins" may comprise naturally occurring, modified, derivatized, labeled and/or non-naturally occurring amino acids and/or amino acid analogues. "Proteins" include, but are not limited to, peptides, polypeptides, glycoproteins and lipoproteins.

The methods and apparatus described herein are of use for model-based fusion of SPM images. Model-based fusion of SPM images may be used to detect, identify and/or otherwise characterize one or more biomolecules. Parameters may be derived from multiple images of a known subject using different SPM imaging modalities. The parameters may be fused with a model of the subject to form a parameter-based characterization of the subject.

In the following detailed description, for the purposes of explanation, numerous specific details are set forth. However, it is understood that the claimed methods and apparatus may be practiced without these specific details. In other instances, well-known circuits, structures, techniques, and devices have not been shown in detail.

Various processes, described below, may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Biomolecules

The following discussion concerns non-limiting examples of known biomolecule structures, such as nucleic acids and proteins. The skilled artisan will realize that other types of known biomolecule structures, including but not limited to lipids, carbohydrates, peptides, oligonucleotides, glycoproteins, glycolipids, lipoproteins, etc. may be analyzed using the disclosed methods and apparatus.

Nucleic Acids

Nucleic acids to be analyzed may be prepared by any technique known in the art. A nucleic acid to be analyzed may comprise a purified or partially purified sample of DNA and/or RNA. Virtually any naturally occurring nucleic acid may be analyzed, including but not limited to chromosomal, plasmid, chloroplast and mitochondrial DNA and messenger, ribosomal, transfer and heterogeneous nuclear RNA. Methods for purifying nucleic acids are known. (E.g., *Guide to Molecular Cloning Techniques*, eds. Berger and Kimmel, Academic Press, New Your, N.Y., 1987; *Molecular Cloning: A Laboratory Manual*, 2nd Ed., eds Sambrook, Fritsch and Maniatis, Cold Spring Harbor Press, Cold Spring Harbor Press, NY, 1989). Nucleic acid purification kits are also commercially available (e.g., Qiagen, Valencia, Calif.; Ambion, Austin, Tex.; Clontech, Palo Alto, Calif.). These methods and kits are exemplary only and any variation known to those of skill in the art may be used.

Other types of nucleic acids to be analyzed may be generated using primer extension or polymerase chain reaction (PCR™) (e.g., U.S. Pat. Nos. 4,683,195, 4,683,202 and 4,800,159). Alternatively, nucleic acids may be inserted into a variety of vectors, such as BACS, YACs, plasmids, viruses, cosmids, phage etc. and the inserts replicated and/or purified. (See, e.g., Berger and Kimmel, 1987; Sambrook et al., 1989.) Nucleic acid inserts may be isolated from vector DNA, for example, by excision with appropriate restriction endonucleases, followed by agarose gel electrophoresis. Methods for isolation of nucleic acid inserts are known in the art. The disclosed methods are not limited as to the source of the nucleic acid to be analyzed and any type of nucleic acid, including prokaryotic, bacterial, viral, eukaryotic, mammalian and/or human may be analyzed within the scope of the claimed subject matter.

Present methods for determining the structures of nucleic acid molecules are largely directed towards nucleic acid sequencing, primarily by some variation of Sanger dideoxy sequencing or hybridization to known oligonucleotide sequences on chip arrays. Nucleic acid sequences may be analyzed by computer processing to identify structural features such as stem-loop forming sequences, palindromic sequences, hairpin structures and protein binding domains. Other current methods of nucleic acid structural analysis include nuclear magnetic resonance (NMR) imaging and X-ray crystallography (see, e.g., http://ndbserver.rutgers.edu/). NMR is only suited for identifying short, relatively simple nucleic acid structures, while X-ray crystallography requires the tedious, time-consuming formation of single-molecule crystals, requiring very large amounts of purified nucleic acid.

Known nucleic acid structures generally fall into one of several categories summarized in Table 1 below. These are sometimes referred to as A, B and Z structures of double-stranded DNA.

TABLE 1

Known Nucleic Acid Structures

| | A | B | Z |
|---|---|---|---|
| Helical sense | Right Handed | Right Handed | Left Handed |
| Diameter | ~26 A | ~20 A | ~18 A |
| Base Pairs per helical turn | 11 | 10 | 12 (6 dimers) |
| Helix pitch (rise per turn) | 28 A | 34 A | 45 A |
| Helix rise per base pair | 2.6 A | 3.4 A | 3.7 A |
| Base tilt normal to the helix axis | 20° | 6° | 7° |
| Major groove | Narrow and deep | Wide and Deep | Flat |
| Minor groove | Wide and Shallow | Narrow and Deep | Narrow and Deep |
| Sugar pucker | C(3')-endo | C(2')-endo | C(2')-endo (pyrimidines) C(3')-endo (purines) |
| Glycosidic bond | Anti | Anti | Anti for pyrimidines Syn for purines |

The skilled artisan will realize that the nucleic acid structures disclosed in Table 1 are exemplary only and other variants of nucleic acid structure are known (see, e.g., http://www.imb-jena.de/ImgLibDoc/nana/IMAGE_NANA.html) and may be used in the disclosed methods. Other non-limiting examples of nucleic acid structure include stem-loops, hairpin sequences, single-stranded regions, bulges, internal loops, junctions, triple stranded, or extended grooves which may indicate protein binding sites. Information on known nucleic acid structures may be obtained, for example, from a variety of databases including, but not limited to, GenBank (http://www.ncbi.nlm.nih.gov/GenBank/Overview.html); the European Molecular Biology Laboratory (http://www.e-bi.ac.uk/embl.html); and the Japanese DNA Database.

The properties of known nucleic acid structures may be used as markers to identify a nucleic acid and/or a nucleic acid conformation in one or more SPM images. In non-purified or partially purified samples, the known structural parameters may be used to determine the locations of nucleic acids on an SPM field, for example to identify regions of the field for more detailed analysis by one or more SPM modalities. In a non-limiting example, such regions may be analyzed by at least one SPM modality, such as AFM, and the data processed to generate a 3D-scan of the nucleic acid minus background noise. The same region may then be scanned using at least one additional modality such as STM or MFM.

Images obtained using different SPM modalities may be aligned by a computer program that recognizes parameters associated with molecular markers, such as a chemically modified nucleotide, a short sequence of labeled nucleotides and/or a bound oligonucleotide probe. Modified nucleotides used as probes may be labeled with a nanoparticle, a heavy metal atom or complex, a radioisotope, or any other label known in the art that is detectable by SPM imaging. Although it is contemplated that such markers may be attached to the nucleic acid or a probe molecule, such alignment markers may also potentially be scattered throughout the SPM field.

The images obtained by different SPM imaging modalities may be fused using physical model based methods, as discussed in detail below. The physical properties of interest may comprise, but are not limited to, nucleic acid structures such as A, B or Z DNA, hairpin loops, etc.

Proteins

Proteins to be analyzed, characterized and/or identified by the disclosed methods and apparatus may be prepared by any method known in the art. Virtually type of any protein may analyzed by the disclosed methods. Proteins to be analyzed may be unpurified, partially purified or purified from organs, tissues, cell homogenates, isolated organelles, blood, saliva, urine, cerebrospinal fluid or fecal samples, tissue biopsies, cell cultures, etc.

Methods for purifying various forms of proteins are known. (E.g., *Protein Purification*, ed. Scopes, Springer-Verlag, New York, N.Y., 1987; *Methods in Molecular Biology: Protein Purification Protocols*, Vol. 59, ed. Doonan, Humana Press, Totowa, N.J., 1996). The methods disclosed in the cited references are exemplary only and any variation known in the art may be used. Where a protein is to be purified, various techniques may be combined, including but not limited to cell fractionation, column chromatography (e.g. size exclusion, ion exchange, reverse phase, affinity, etc.), Fast Performance Liquid Chromatography (FPLC), High Performance Liquid Chromatography (HPLC), gel electrophoresis, precipitation with salts, pH, organic solvents or antibodies, ultrafiltration and/or ultracentrifugation.

Either natural or non-naturally occurring proteins may be analyzed. For example, proteins for analysis may be prepared by cloning a cDNA library into an expression vector, transfecting host cells, expressing the cloned proteins and purifying a tagged protein (e.g., H is, Flag-tagged) by affinity chromatography. The disclosed methods are not limited as to the source of the protein to be analyzed and any type of protein, including prokaryotic, bacterial, viral, eukaryotic, mammalian and/or human may be analyzed within the scope of the claimed matter.

Known protein structures may be used for the model-based fusion of SPM images of proteins. Known protein structures may include, but are not limited to, primary, secondary, tertiary and quaternary protein structure. Present methods for determining protein structure include x-ray crystallography, mass spectroscopy, protein sequencing by Edman degradation, molecular modeling, circular dichroism, surface enhanced Raman spectroscopy (SERS), NMR and electron micrography. In general, such techniques are time consuming and costly with respect to the apparatus and the amount of purified protein required. Certain types of proteins, such as integral membrane proteins, are not easily analyzed by standard methods. With most of these technologies, the sample to be analyzed has been extensively manipulated during preparation, which may lead to artifacts in the molecular structure.

Known protein structural information may be obtained from a variety of databases, such as the Protein Data Bank (http://www.rcsb.org/pdb/); Motif in Protein Databases (http//alces.med.umn.edu/dbmotif.html); Incyte Genomics Proteome® BioKnowledge Library (http://www.incyte.com/sequence/proteome/index.shtml); National Center for Biotechnology Information (http://www.ddbj.nig.acjp); protein crystallization database (http://www.bmcd.nist.gov.8080/bmcd/bmcd.html); SWISS-PROT (http:www.expasy.ch); NIST Surface Structure Database (http://www.nist.gov/srd/nist42.htm); non-redundant protein sequence database (http://www.bmbsgi11.leeds.ac.uk/bmb5dp/owl.html); the protein identification resource database (http:/www-nbrf-.georgetown.edu) and the Celera Discovery System (http://cds.com).

Secondary Structure Prediction Methods

The primary structure of proteins consists of the linear sequence of amino acids, plus any additional covalent bonds such as disulfide bridges. Protein primary structure may be determined by Edman degradation, or more commonly by sequencing and translation of a cDNA sequence that encodes the protein. Commercial protein sequencers are available from a variety of sources, such as Applied Biosystems (Foster City, Calif.).

Protein secondary structure consists of regularly repeating structural motifs, which are largely stabilized by intramolecular hydrogen bonding. Typical protein secondary structures include alpha helices, beta sheets and reverse turns. The amount of secondary structure in a purified protein may be determined by circular dichroism (CD) spectroscopy. However, CD spectroscopy gives no indication of where within a protein sequence a given secondary structure may be located. Precise structural information about protein conformation may be provided by X-ray crystallography or, to a limited extent, by other techniques such as NMR.

Computer modeling of protein structure has also been used to predict the locations of elements of secondary structure, based upon empirical rules such as those proposed by Chou and Fasman (*Adv. Enzymol.* 47:45-148, 1978). Each type of amino acid residue is assigned a probability value of forming different types of secondary structure and a moving window algorithm looks for regions of probable alpha helices, beta sheets and reverse turns. Such empirical analyses are of some use in predicting secondary structure, but the methods are not entirely accurate. Various exemplary databases containing protein structural information and/or computer programs for predicting protein structure are shown in Table 2 below. (See also, http://www.aber.ac.uk/~phiwww/prof; http://www.embl-heidelberg.de/cgi/predator_serv.pl; http://www.embl-heidelberg.de/predictprotein/ppDoPredDef.html;).

TABLE 2

Protein Structure Databases

| Database | Web Sites |
| --- | --- |
| FASTA | http://www2.ebi.ac.uk/fasta3 |
| BLAST | http://www.ncbi.nlm.nih.gov/BLAST/ |
| | http://www2.ebi.ac.uk/blast2/ |
| Clustal W | http://www2.ebi.ac.uk/clustalw |
| AMAS | http://barton.ebi.ac.uk/servers/amas_server.html |
| PDB | http://www.rcsb.org |
| PROCHECK | http://www.biochem.ucl.ac.uk/~roman/procheck/procheck.html |
| COMPOSER | http://www-cryst.bioc.cam.ac.uk |
| MODELLER | http://guitar.rockefeller.edu/modeller.html |
| SWISS-MODEL | http://www.expasy.ch/swissmod/SWISS-MODEL.html |
| SCOP | http://scop.mrc-lmb.cam.ac.uk./scop |
| CATH | http://www.biochem.ucl.ac.uk/bsm/cath |
| FSSP | http://www2ebi.ac.uk/dali/fssp.html |
| MMDB | http://www.ncbi.nlm.nih.gov/Structure/MMDB/mmdb/html |
| THREADER | http://insulin.brunel.ac.uk/threader/threader.html |
| TOPITS | http://www.embl-heidelberg.de/preditprotein/ppDoPredDef.html |
| CASP | http://predictioncenter.llnl.gov/casp2/Casp2.html |
| | http://predictioncenter.llnl.gov/casp3 |

Parameters for protein secondary structures are provided in Table 3 below (Creighton, *Proteins: Structures and Molecular Properties*, Ch. 5, W.H. Freeman, New York, N.Y., 1984). Other secondary structure parameters are well known in the art, for example the hydrogen bond length of 2.86 Å for a right-handed alpha helix. Ranges of parameters for various types of protein secondary structure were disclosed by Ramachandran and Sasisekharan (*Adv. Protein Chem.* 23:283-437, 1968).

TABLE 3

Protein Secondary Structure Parameters

| Secondary Structure | Bond Angle $\phi$ | $\Psi$ | $\omega$ | Residues per Turn | Translation per residue |
| --- | --- | --- | --- | --- | --- |
| Antiparallel β-Sheet | −139 | +135 | −178 | 2.0 | 3.4 Å |
| Parallel β-Sheet | −119 | +113 | 180 | 2.0 | 3.2 |
| Right-handed α-Helix | −57 | −47 | 180 | 3.6 | 1.50 |
| $3_{10}$ Helix | −49 | −26 | 180 | 3.0 | 2.00 |
| π Helix | −57 | −70 | 180 | 4.4 | 1.15 |

Protein secondary structures may be identified in an unknown protein sample by SPM technologies. These features may be used as markers to align the processed data of several images generated by the SPM technologies and/or to identify the sample object. The physical properties of interest may comprise, but are not limited to, protein secondary structures such as α-helices, β-pleated sheets, reverse turns, etc. Such structures may be identified by AFM, STM or any other type of scanning probe microscopy.

Protein tertiary structure comprises the complete three-dimensional structure of a protein. Present methods for determining tertiary structure primarily consist of X-ray crystallography, with limited structural information available from NMR and similar techniques. Tertiary structure is directly related to the field of protein folding, which is an active area of research in determining protein structure-function relationships. Such studies may be of use, for example, to design novel, more effective pharmaceutical compounds, inhibitors and/or activators of enzyme activity.

Quaternary structure concerns the assembly of two or more proteins into a complex. Such complex formation may also be important in regulating enzyme activity and/or in signal transduction processes. The disclosed methods and apparatus are of use for determining the primary, secondary, tertiary and quaternary structures of biomolecules, such as nucleic acids and/or proteins. Various modes of SPM imaging may be used to determine such structural information. Probes may be of use to identify particular types of nucleic acid or protein structure, such as protein binding sites on nucleic acids, catalytic or other active sites on proteins, antibody binding domains, etc. A variety of probes for nucleic acid and/or protein structure are known in the art and any such known probe may be used. Probes may be untagged or may be tagged with one or more labels that are detectable by SPM imaging. In a non-limiting example disclosed below, an untagged oligonucleotide probe is imaged by AFM spectroscopy. However, the skilled artisan will realize that probes for nucleic acid or protein structures may be labeled with various SPM tags, discussed in more detail below. Such probes may comprise any type of structural probe known in the art, such as antibodies, antibody fragments, aptamers, oligonucleotides and/or oligonucleotide analogs.

Alignment by Molecular Combing

SPM labels, probes and/or biomolecules to be analyzed may be attached to a surface and aligned prior to analysis. Alignment may provide for an increased accuracy and/or speed of analysis. Molecules or SPM labels that are placed upon a surface in a disorganized pattern may overlap with each other or be partially obscured, complicating their detection and/or identification.

Methods and apparatus for attachment to surfaces and alignment of molecules, such as nucleic acids, proteins and/or probes are known in the art. (See, e.g., Bensimon et al., Phys. Rev. Lett. 74:4754-57, 1995; Michalet et al., Science 277:1518-23, 1997; U.S. Pat. Nos. 5,840,862; 6,054,327; 6,225,055; 6,248,537; 6,265,153; 6,303,296 and 6,344,319.) For example, molecules may be attached to a surface and aligned using physical forces inherent in an air-water meniscus or other types of interfaces. This technique is generally known as molecular combing. Molecules dissolved in an aqueous medium may be attached at either one or both ends to a surface, such as a silanized glass slide, a biotinylated surface, a gold-coated surface or any other surface known in the art. The surface may be slowly withdrawn from the aqueous medium. Polar or charged target molecules, such as nucleic acids and most proteins, will preferentially partition into the hydrophilic (aqueous) medium. Thus, removal of the surface from the aqueous medium results in stretching of the bound target molecules, parallel to the direction of movement of the meniscus. There is a direct correlation between the measured length of the stretched molecule and its actual size, with 1 μm of stretched length corresponding to about 2,000 bases of nucleic acid sequence (Herrick et al., Proc. Natl. Acad. Sci. USA 97:222-227, 2000).

Once the surface has been entirely removed from the aqueous medium, the attached molecules are aligned in a parallel fashion that may be more easily and accurately analyzed. The technique is not limited by the size of the target molecules to be aligned, and can work on nucleic acids as long as whole chromosomes (e.g., Michalet et al., 1997; Herrick et al., 2000). At appropriate rates of movement of the meniscus the shear forces generated are relatively low, resulting in aligned DNA fragments of several hundred kilobases or longer (Michalet et al., 1997).

Molecular combing is inhibited by strong nonspecific adsorption of molecules to the treated surface (Bensimon et al., 1995). Thus, the surface may be treated so that only one or more ends of a target molecule will bind to the surface. Methods for binding nucleic acids, proteins and other types of molecules to surfaces are well known in the art and are summarized below. In a non-limiting example, target molecules may be covalently modified with biotin residues at one or both ends of the molecule. Upon exposure to an avidin or streptavidin coated surface, only the biotinylated ends will bind to the surface. Nonspecific adsorption to a surface may be decreased by the use of surfaces that are hydrophobic in nature, such as silanized surfaces.

The disclosed methods and apparatus are not limited by the type of surface that may be used. Non-limiting examples of surfaces include glass, functionalized glass, ceramic, plastic, polystyrene, polypropylene, polyethylene, polycarbonate, PTFE (polytetrafluoroethylene), PVP (polyvinylpyrrolidone), germanium, silicon, quartz, gallium arsenide, gold, silver, nylon, nitrocellulose or any other material known in the art that is capable of having target molecules attached to the surface. Attachment may be either by covalent or noncovalent interaction.

Alternative methods for aligning target molecules on surfaces are known in the art. (E.g., Bensimon et al., 1995; Michalet et al., 1997; U.S. Pat. Nos. 5,840,862; 6,054,327; 6,225,055; 6,248,537; 6,265,153; 6,303,296 and 6,344,319). It is contemplated that any known method of alignment may be used within the scope of the claimed subject matter. In certain embodiments of the invention, alignment occurs when target molecules dissolved in an aqueous medium are drawn through a moving meniscus. The mechanism by which the meniscus is moved is not important and may be accomplished, for example, by immersing a surface in buffer solution and slowly withdrawing it from the solution. Alternatively, a surface may be immersed in a solution and the level of the meniscus may be slowly lowered by evaporation or by removal of liquid. In another alternative, a drop of solution may be placed between a cover slip and a surface, such as a glass slide. The surface may be slowly pulled away from the cover slip. Because the solution adheres to the cover slip, this results in the formation of an air-water interface at the edge where the cover slip contacts the surface. Moving this interface aligns the target molecules on the surface. Another alternative method for aligning molecules involves use of free-flow electrophoresis either in place of or during molecular combing. Alternatively, molecules may be aligned by microfluidic molecular combing, as discussed in the Examples below.

Hybridization and Ligation of Oligonucleotide-Based Probes

Hybridization of a target nucleic acid to an SPM-tagged oligonucleotide may occur under stringent conditions that only allow hybridization between fully complementary nucleic acid sequences. Low stringency hybridization is generally performed at 0.15 M to 0.9 M NaCl at a temperature range of 20° C. to 50° C. High stringency hybridization is generally performed at 0.02 M to 0.15 M NaCl at a temperature range of 50° C. to 70° C. It is understood that the temperature and/or ionic strength of an appropriate stringency are determined in part by the length of an oligonucleotide probe, the base content of the target sequences, and the presence of formamide, tetramethylammonium chloride or other solvents in the hybridization mixture. The ranges mentioned above are exemplary and the appropriate stringency for a particular hybridization reaction is often determined empirically by comparison to positive and/or negative controls. The person of ordinary skill in the art is able to routinely adjust hybridization conditions to allow for only stringent hybridization between exactly complementary nucleic acid sequences to occur.

Once short oligonucleotide probes have been hybridized to a nucleic acid, adjacent probes may be ligated together using known methods (see, e.g., U.S. Pat. No. 6,013,456). Oligonucleotide sequences of as short as 6 to 8 bases may be efficiently hybridized to target nucleic acids (U.S. Pat. No. 6,013,456). Primer independent ligation may be accomplished using oligonucleotides of at least 6 to 8 bases in length (Kaczorowski and Szybalski, Gene 179:189-193, 1996; Kotler et al., Proc. Natl. Acad. Sci. USA 90:4241-45, 1993). Methods of ligating oligonucleotide probes that are hybridized to a nucleic acid target are known in the art (U.S. Pat. No. 6,013,456). Enzymatic ligation of adjacent oligonucleotide probes may utilize a DNA ligase, such as T4, T7 or Taq ligase or *E. coli* DNA ligase. Methods of enzymatic ligation are known (e.g., Sambrook et al., 1989).

Immobilization of Molecules

The target molecules to be analyzed may be immobilized prior to SPM analysis. Although the following discussion is directed towards immobilization of nucleic acids, the skilled artisan will realize that methods of immobilizing various types of biomolecules are known in the art and may be used in the claimed methods.

Immobilization of nucleic acids may be achieved by a variety of methods known in the art. For example, immobilization may be achieved by coating a substrate with streptavidin or avidin and the subsequent attachment of a biotinylated nucleic acid (Holmstrom et al., *Anal. Biochem.* 209:278-283, 1993). Immobilization may also occur by coating a silicon, glass or other substrate with poly-L-Lys (lysine), followed by covalent attachment of either amino- or sulfhydryl-modified nucleic acids using bifunctional crosslinking reagents (Running et al., *BioTechniques* 8:276-277, 1990; Newton et al., *Nucleic Acids Res.* 21:1155-62, 1993). Amine residues may be introduced onto a substrate through the use of aminosilane for cross-linking.

Immobilization may take place by direct covalent attachment of 5'-phosphorylated nucleic acids to chemically modified substrates (Rasmussen et al., *Anal. Biochem.* 198:138-142, 1991). The covalent bond between the nucleic acid and the substrate is formed by condensation with a water-soluble carbodiimide or other cross-linking reagent. This method facilitates a predominantly 5'-attachment of the nucleic acids via their 5'-phosphates. Exemplary modified substrates would include a glass slide or cover slip that has been treated in an acid bath, exposing SiOH groups on the glass (U.S. Pat. No. 5,840,862).

DNA is commonly bound to glass by first silanizing the glass substrate, then activating with carbodiimide or glutaraldehyde. Alternative procedures may use reagents such as 3-glycidoxypropyltrimethoxysilane (GOP), vinyl silane or aminopropyltrimethoxysilane (APTS) with DNA linked via amino linkers incorporated either at the 3' or 5' end of the molecule. DNA may be bound directly to membrane substrates using ultraviolet radiation. Other non-limiting examples of immobilization techniques for nucleic acids are disclosed in U.S. Pat. Nos. 5,610,287, 5,776,674 and 6,225,068. Commercially available substrates for nucleic acid binding are available, such as Covalink, Costar, Estapor, Bangs and Dynal. The skilled artisan will realize that the disclosed methods are not limited to immobilization of nucleic acids and are also of potential use, for example, to attach proteins, lipids, carbohydrates or other biomolecules to a substrate.

The type of substrate to be used for immobilization is not limiting. The immobilization substrate may be magnetic beads, non-magnetic beads, a planar substrate or any other conformation of solid substrate comprising almost any material. Non-limiting examples of substrates that may be used include glass, silica, silicate, PDMS (poly dimethyl siloxane), silver or other metal coated substrates, nitrocellulose, nylon, activated quartz, activated glass, polyvinylidene difluoride (PVDF), polystyrene, polyacrylamide, other polymers such as poly(vinyl chloride) or poly(methyl methacrylate), and photopolymers which contain photoreactive species such as nitrenes, carbenes and ketyl radicals capable of forming covalent links with target molecules (See U.S. Pat. Nos. 5,405,766 and 5,986,076).

Bifunctional cross-linking reagents may be of use for immobilization and/or labeling. The bifunctional cross-linking reagents can be divided according to the specificity of their functional groups, e.g., amino, guanidino, indole, or carboxyl specific groups. Of these, reagents directed to free amino groups are popular because of their commercial availability, ease of synthesis and the mild reaction conditions under which they can be applied. Exemplary methods for cross-linking molecules are disclosed in U.S. Pat. Nos. 5,603,872 and 5,401,511. Cross-linking reagents include glutaraldehyde (GAD), bifunctional oxirane (OXR), ethylene glycol diglycidyl ether (EGDE), and carbodiimides, such as 1-ethyl-3-(3-dimethylaminopropyl) carbodiimide (EDC).

Labels

Probes and/or structural features of subjects may be tagged with one or more labels to facilitate detection and/or identification of structural features or to assist in aligning images obtained by different SPM modalities. Any label known in the art that is detectable by SPM may be used. The following examples are not limiting and the skilled artisan will realize that other types of known labels may be used in the practice of the claimed subject matter.

Nanoparticles

Labels may comprise individual nanoparticles and/or nanoparticle aggregates. Nanoparticles of use may comprise silver or gold nanoparticles. Nanoparticles with an average diameter of 10 to 50 nm, 50 to 100 nm or about 100 nm are contemplated. The nanoparticles may be approximately spherical in shape, although nanoparticles of any shape or of irregular shape may be used. Methods of preparing nanoparticles are known (e.g., U.S. Pat. Nos. 6,054,495; 6,127,120; 6,149,868; Lee and Meisel, *J. Phys. Chem.* 86:3391-3395, 1982). Nanoparticles may also be commercially obtained (e.g., Nanoprobes Inc., Yaphank, N.Y.; Polysciences, Inc., Warrington, Pa.).

The nanoparticle labels may be random aggregates of nanoparticles (colloidal nanoparticles). Alternatively, nanoparticles may be cross-linked to produce particular aggregates of nanoparticles, such as dimers, trimers, tetramers or other aggregates. Methods of cross-linking nanoparticles are known in the art (see, e.g., Feldheim, "Assembly of metal nanoparticle arrays using molecular bridges," The Electrochemical Society Interface, Fall, 2001, pp. 22-25). Reaction of gold nanoparticles with linker compounds bearing terminal thiol or sulfhydryl groups is known (Feldheim, 2001). Gold or silver nanoparticles may be coated with derivatized silanes, such as aminosilane, 3-glycidoxypropyltrimethoxysilane (GOP) or aminopropyltrimethoxysilane (APTS). The reactive groups at the ends of the silanes may be used to form cross-linked aggregates of nanoparticles or to attach the nanoparticles to a probe or other molecule, such as a nucleic acid or a protein.

Nanoparticles may also be modified to contain various reactive groups for attachment to other compounds. Modified nanoparticles are commercially available, such as the Nanogold® nanoparticles from Nanoprobes, Inc. (Yaphank, N.Y.).

Metallic Barcodes

Labels may comprise submicrometer metallic barcodes (e.g., Nicewarner-Pena et al., Science 294:137-141, 2001). Nicewarner-Pena et al. (2001) disclose methods of preparing multimetal microrods encoded with submicrometer stripes, comprised of different types of metal. This system allows for the production of a very large number of distinguishable barcode labels-up to 4160 using two types of metal and as many as $8 \times 10^5$ with three different types of metal. Such labels may be attached to probes and/or subject molecules and read by SPM technology. Methods of attaching metal particles, such as gold or silver, to oligonucleotide and other types of molecules are known in the art (e.g., U.S. Pat. No. 5,472,881).

Carbon Nanotubes

Another exemplary label of use in the disclosed methods concerns single-walled carbon nanotubes (SWNTs). Nanotubes may be made in a variety of shapes and sizes that may be distinguished by SPM methods. (See, e.g., Freitag et al., Phys. Rev. B 62:R2307-R2310, 2000; Clauss et al., Europhys. Lett. 47:601-607, 1999; Clauss et al., Phys. Rev. B. 58:R4266-4269, 1998; Odom et al., Ann. N.Y. Acad. Sci. 960:203-215, 2002). Odom et al. (2002) disclose an STM technique that is capable of detecting discrete peaks in the tunneling spectra of SWNTs of 10 nm or less in size.

The electronic properties of carbon nanotubes are modulated by the length of the tube. Nanotubes to be used as labels may have tube lengths of about 10 to 100, 220, 300 nm and a diameter of about 1.2 to 1.4 nm. The length or diameter of the nanotubes to be used as labels is not limited and nanotubes of virtually any length or diameter are contemplated. Nanotubes may be prepared by known methods or obtained from commercial sources, for example, CarboLex (Lexington, Ky.), NanoLab (Watertown, Mass.), Materials and Electrochemical Research (Tucson, Ariz.) or Carbon Nano Technologies Inc. (Houston, Tex.).

Carbon nanotubes of varying length and/or diameter may also be produced by a variety of techniques known in the art, including but not limited to carbon-arc discharge, chemical vapor deposition via catalytic pyrolysis of hydrocarbons, plasma assisted chemical vapor deposition, laser ablation of a catalytic metal-containing graphite target, or condensed-phase electrolysis. (See, e.g., U.S. Pat. Nos. 6,258,401, 6,283,812 and 6,297,592.) Nanotubes may be size sorted by mass spectrometry (see, Parker et al., J. Am. Chem. Soc. 113:7499-7503, 1991). Alternatively, nanotubes may be sorted using an AFM (atomic force microscope) or STM (scanning tunneling microscope). Other methods of size fractionation known in the art, such as gas chromatography, time of flight mass spectrometry, ultrafiltration or equivalent techniques are contemplated. Once sorted, the carbon nanotubes may be derivatized and covalently attached to probes, nucleic acids and/or proteins. The examples discussed above are not limiting and any method of producing carbon nanotubes may be used (e.g., U.S. Pat. Nos. 6,258,401; 6,283,812 and 6,297,592).

Carbon nanotubes may be derivatized with reactive groups to facilitate attachment to probes or subject molecules. In a non-limiting example, nanotubes may be derivatized to contain carboxylic acid groups (U.S. Pat. No. 6,187,823). Carboxylate derivatized nanotubes may be attached to probe molecules by standard chemistries, for example by carbodiimide mediated formation of an amide linkage with a primary or secondary amine group located on the probe. The methods of derivatization and cross-linking are not limiting and any reactive group or cross-linking methods known in the art may be used.

Fullerenes

Fullerenes may be of use to label probes, nucleic acids and/or proteins. Methods of producing fullerenes are well known (e.g., U.S. Pat. No. 6,358,375). Fullerenes may be derivatized and attached to other molecules by methods similar to those disclosed above for carbon nanotubes. Fullerene-labeled probes or structures may be identified by SPM technologies.

The skilled artisan will realize that the tags of used in the disclosed methods are not limited to those disclosed herein, but may include any other type of known tag that may be attached to a probe or subject molecule and detected. Other non-limiting examples of tags of potential use include quantum dots (e.g., Schoenfeld, et al., Proc. 7th Int. Conf. on Modulated Semiconductor Structures, Madrid, pp. 605-608, 1995; Zhao, et al., 1st Int. Conf. on Low Dimensional Structures and Devices, Singapore, pp. 467-471, 1995). Quantum dots and other types of tags may be synthesized by known methods and/or obtained from commercial sources (e.g., Quantum Dot Corp., Hayward, Calif.).

Quantum Dot Microbeads

SPM labels may also comprise quantum dot tagged microbeads, as disclosed in Han et al. (*Nature Biotech.* 19:631-635, 2001). Multicolor optical coded microbeads were created by embedding different sized quantum dots (zin-sulfide-capped cadmium selenide nanocrystals) into polymeric microbeads at precisely controlled rations. Although the 2001 publication concerned use of microbeads for fluorescent tagging and detection, the skilled artisan will realize that such beads could also be used in other detection modalities, such as SPM imaging. Alternatively, porous silicon photonic crystals, encoded through galvanostatic anodic etching, have been proposed (Cunin et al., *Nature Materials* 1:39-41, 2002). Such micron sized, nanostructured particles may also be of use for SPM labels.

Scanning Probe Microscopy (SPM)

Scanning probe microscopes are a class of instruments that may be used to measure the physical properties of subjects on a micrometer and/or nanometer scale. Different modalities of SPM technology are known and any such modality may be used for biomolecule detection, characterization and/or identification. In general, an SPM instrument uses a very small, pointed probe in very close proximity to a surface to measure the properties of subjects. The probe may be mounted on a cantilever that may be a few hundred microns in length and between about 0.5 and 5.0 microns thick. Typically, the probe tip is raster-scanned across a surface in an xy pattern to map localized variations in surface properties. SPM methods of use for imaging biomolecules and/or detecting probe molecule are well known in the art (e.g., Wang et al., Amer. Chem. Soc. Lett., 12:1697-98. 1996; Kim et al., Appl. Surface Sci. 130, 230, 340-132:602-609, 1998; Kobayashi et al., Appl. Surface Sci. 157:228-32, 2000; Hirahara et al., Phys. Rev. Lett. 85:5384-87, 2000; Klein et al., Applied Phys. Lett. 78:2396-98, 2001; Huang et al., Science 291:630-33, 2001; Ando et al., Proc. Natl. Acad. Sci. USA 12468-72, 2001).

Scanning Tunneling Microscopy

Scanning Tunneling Microscopy (STM) was the first SPM technique developed. STM relies on the existence of quantum mechanical electron tunneling between the probe tip and sample surface. The tip is sharpened to a fine point, potentially as small as a single atom. The tip is raster scanned across a surface, maintaining a probe-surface gap distance of a few angstroms without actually contacting the surface. A small electrical voltage difference (on the order of millivolts to a few volts) is applied between the probe tip and sample and the tunneling current between tip and sample is determined. As the tip scans across the surfaces, differences in the electrical and topographic properties of the sample cause variations in the amount of tunneling current. By scanning the tip across the surface and measuring the tunneling current, individual atoms can potentially be imaged.

The relative height of the tip may be controlled by piezoelectric elements with feedback control, interfaced with a computer. The computer may monitor the current intensity in real time and move the tip up or down to maintain a relatively constant current. The height of the tip and/or current intensity may be processed by the computer to develop an image of the scanned surface.

Because STM measures the electrical properties of the sample as well as the sample topography, it is capable of identifying different types of conductive material, such as metal nanoparticles or barcodes. STM is also capable of measuring local electron density in subjects. Electron density measurements may be used to identify and/or characterize the structures of biomolecules, using known STM techniques.

Atomic Force Microscopy

Another modality of SPM is atomic force microscopy (AFM). Methods of biomolecule analysis by AFM are generally known in the art (e.g., Uchihashi et al., "Application of Noncontact-Mode Atomic Force Microscopy to Molecular Imaging," http://www.foresight.org/Conferences/MNT7/Abstracts/Uchihashi). Within AFM, different modes of operation are possible, including contact mode, non-contact mode and TappingMode™.

In contact mode, the atomic force between probe tip and sample surface is measured by keeping the tip-sample distance constant and measuring the deflection of the cantilever, typically by reflecting a laser off the cantilever onto a position sensitive detector. Cantilever deflection results in a change in position of the reflected laser beam. As in STM, the height of the probe tip may be computer controlled using piezoelectric elements with feedback control and a relatively constant degree of deflection may be maintained by raising or lowering the probe tip. Because the probe tip may be in contact with the sample within the molecular force range (i.e. within the range of interaction of Van der Waals forces), contact mode AFM tends to deform non-rigid samples. In non-contact mode, the tip is maintained between about 50 to 150 angstrom above the sample surface and the tip is oscillated. Van der Waals interactions between the tip and sample surface are reflected in changes in the phase, amplitude or frequency of tip oscillation.

In TappingMode™, the cantilever is oscillated at or near its resonant frequency using piezoelectric elements. The AFM tip periodically contacts (taps) the sample surface, at a frequency of about 50,000 to 500,000 cycles per second in air and a lower frequency in liquids. As the tip begins to contact the sample surface, the amplitude of the oscillation decreases. Changes in amplitude are used to determine topographic properties of the sample. Because AFM analysis does not depend on electrical conductance, it may be used to analyze the topological properties of non-conductive materials.

AFM microscopy has been used to examine the structures of a wide variety of biomolecules (e.g., U.S. Pat. No. 5,497,656; Moller et al., *Biophys. J.*, 77:1150-8, 1999; Thundat et al., *Scanning Microsc.* 6:911-8, 1992; Hansma et al., *Nucleic Acids Res.*, 21:505-12, 1993; Murray et al., *Proc. Natl. Acad. Sci. USA*, 90:3811-4, 1993). By attaching specific antibodies to cantilevers, the simultaneous imaging of target antigens and the identification of antigen-antibody interactions have been demonstrated.

Magnetic Force Microscopy

Magnetic force microscopy (MFM) is an SPM technique that measures magnetic fields in a sample, using a magnetic probe tip. As a specimen is raster scanned, magnetic forces originating from the sample cause a deflection of the cantilever that is monitored by a laser system as discussed above. Feedback from a controller continually adjusts the Z (vertical) position of the sample to keep the cantilever deflection at a constant value while scanning.

To enhance sensitivity, most MFM instruments oscillate the cantilever near its resonant frequency with a piezoelectric element. Gradients in the magnetic forces shift the resonant frequency of the cantilever. Monitoring the changes in oscillation amplitude or phase produces a magnetic force image. In certain embodiments of the invention, magnetically tagged probes and/or structures may be imaged using MFM.

The skilled artisan will realize that the claimed methods and apparatus are not limited to the disclosed SPM techniques, but may utilize any known SPM imaging modality. Other SPM modes of potential use include high frequency MFM, magnetoresistive sensitivity mapping (MSM), electric force microscopy (EFM), scanning capacitance microscopy (SCM), scanning spreading resistance microscopy (SSRM), lateral force microscopy (LFM), tunneling AFM and conductive AFM. Another variation is chemical force microscopy (CFM), in which the probe tip is functionalized with a chemical species and scanned over a sample to detect adhesion forces between the chemical species and the sample (e.g., Frisbie et al., *Science* 265:2071-2074, 1994). Another SPM mode of potential use is force modulation imaging (Maivald et al., *Nanotechnology* 2:103, 1991). Uchihashi et al. (http://www.foresight.org/Conferences/MNT7/Abstracts/Uchihashi) disclose a method of biomolecule imaging using frequency modulation in non-contact mode AFM.

SPM instruments of use for biomolecule analysis, detection and/or identification are commercially available (e.g. Veeco Instruments, Inc., Plainview, N.Y.; Digital Instruments, Oakland, Calif.). Alternatively, custom designed SPM instruments may be used.

Image Analysis and Parameter Fusion

Novel methods for analyzing SPM images, obtained using different imaging modalities, are disclosed herein. Present methods for cross-referencing different images largely involve visual observation, with only qualitative cross-referencing of statistical features. In most cases only one sensing modality is used and images are very rarely combined to analyze the same region of a sample by different modalities. The disclosed methods provide for the quantitative cross-referencing of SPM images obtained by different sensing modalities.

Presently, fusion of multiple images is usually done by combining the data sets (images) on a pixel-by-pixel basis to create a multi-feature image. This technique requires the precise alignment of individual images to create a multi-feature image on the same grid, which is extremely difficult without known calibration landmarks. Present methods also do not employ knowledge about biomolecule structures to assist in SPM image analysis.

The disclosed methods provide for three-dimensional analysis of nanoscale structures by quantitative modeling of the imaging process. Molecular models of the subjects under investigation, such as the A, B or Z DNA structures or the alpha helix, beta sheet or reverse turn protein structures discussed above, may be used to develop parameterized models of the SPM images. Such parameterized models may be obtained, for example, by constructing computer-modeled theoretical images of known biomolecule structures, as imaged by different SPM modalities, and generating ranges of parameters by image data analysis as discussed below. Alternatively, purified biomolecules of known structure may be imaged using different SPM modalities and parameter ranges directly determined for different types of known structures. The parametric characteristics of known structures may then be used to analyze unknown samples for the presence of known biomolecule structures, or to identify a known biomolecule structure in a sample field. Alternatively, unknown subject molecules may be characterized, based on similarities with models of known structures. The structural models may be formulated as hierarchies of geometric primitives or by using probabilistic differential equations that define the level set surface properties of the objects. Such techniques are known in the art of image analysis.

One or more parameters may be quantitatively estimated from a plurality of images of a subject, obtained with different SPM modalities. Model-based parameters of interest may be extracted from SPM images by using known model-based image analysis tools, including but not limited to PDE (partial differential equation) techniques, level-set techniques and active surface techniques (e.g., U.S. Pat. Nos. 6,078,681; 6,195,445; 6,259,802; 6,345,235). Such techniques may be embedded in a probabilistic (Bayesian) estimation framework to account for model uncertainty and instrument noise.

Estimated parameters obtained from different imaging modalities may be combined (fused) using a model of the subject to form a parameter-based characterization of the subject. Estimated parameter sets from individual images, together with their respective error bounds, may be combined into a final parameter estimate related to the type and orientation of the subjects to be identified. The characterization of the subject may be used for subject classification by utilizing one or more statistical classifiers. The statistical classifiers employed in characterizing a subject may include, but are not limited to, vector quantization and support vector machines (e.g., U.S. Pat. Nos. 6,327,581 and 6,360,020). Vector quantization is a method of reducing a large quantity of information to eliminate excess or redundant data, without losing the essential content of the data as it pertains to the intended use of the information. Methods of vector quantization as applied to digitized images are known (U.S. Pat. No. 6,360,020). A support vector machine is an example of a kernel-based learning method. Such learning machines have been used to train object classifier programs based on a set of training examples represented by feature vectors and predetermined classifications (U.S. Pat. Nos. 6,157,921 and 6,327,581). Such training example sets may comprise, for example, known biomolecule structures obtained from one or more databases listed above.

EXAMPLES

Example 1

Model-Based Fusion of SPM Images

FIG. 1 illustrates an exemplary method 100 for model-based fusion 145 of image parameters 120, 140. A plurality of properties 105, 125 of a subject to be analyzed are designated as Property I 105 through Property N 125. Within the scope of the claimed subject matter, a property 105, 125 may be virtually any characteristic of a subject. For example, a property 105, 125 might represent an electron density distribution of a subject. Alternatively, a property 105, 125 might represent a degree of curvature for a portion of a subject. Any characteristic of a subject that is detectable by SPM imaging may be a property 105, 125.

An appropriate SPM sensing modality is used to obtain data 110, 130 for each of the properties 105, 125. It is contemplated that multiple properties 105, 125 may be detected using the same SPM modality. Alternatively, different properties 105, 125 may be detected by different SPM modalities. The data is subjected to model-based analysis 115, 135, using one or more models 150 of the physical structures of known subjects to refine the analysis 115, 135. As discussed above, model-based analysis 115, 135 could take multiple forms. For example, where a learning machine, such as a support vector machine is used, models 150 of one or more known biomolecule structures could be used as training data sets. The machine would thus "learn" to recognize various types of biomolecules by their similarity to known biomolecule structures. As part of the learning process, the degree of variability observed in one or more properties 105, 125 of known biomolecule structures could be incorporated into the model 150.

The data analysis 115, 135 results in the generation of a series of parameters 120, 140. The method 100 exemplified in FIG. 1 shows that a parameter 120, 140 is generated from each property 105, 125. However, it is possible that multiple parameters 120, 140 may be generated from a single property 105, 125, that a single parameter 120, 140 may be generated from each property 105, 125, or that multiple properties 105, 125 may be used to generate a single parameter 120, 140. The parameters 120, 140 may or may not represent some real-world characteristic of the subject. For example, a parameter 120, 140 generated for a nucleic acid subject could potentially be the base pair repeat distance in a double-stranded molecule of B-DNA (3.4 Å). Alternatively, a parameter 120, 140 may be a numerical value and/or mathematical function that does not directly represent any physical characteristic of the subject.

The parameters 120, 140 may be combined or fused together 140, based on the model 150, to form a parameter-based characterization of the known subject. Procedures suitable for parameter fusion 145 that are known in the art are discussed above. A set of one or more images may be analyzed by the disclosed method 100 using a parameter-based characterization of a sample to determine whether a known subject is present. For example, a subject could be a specific probe molecule attached to a target nucleic acid or protein.

Figure 2:
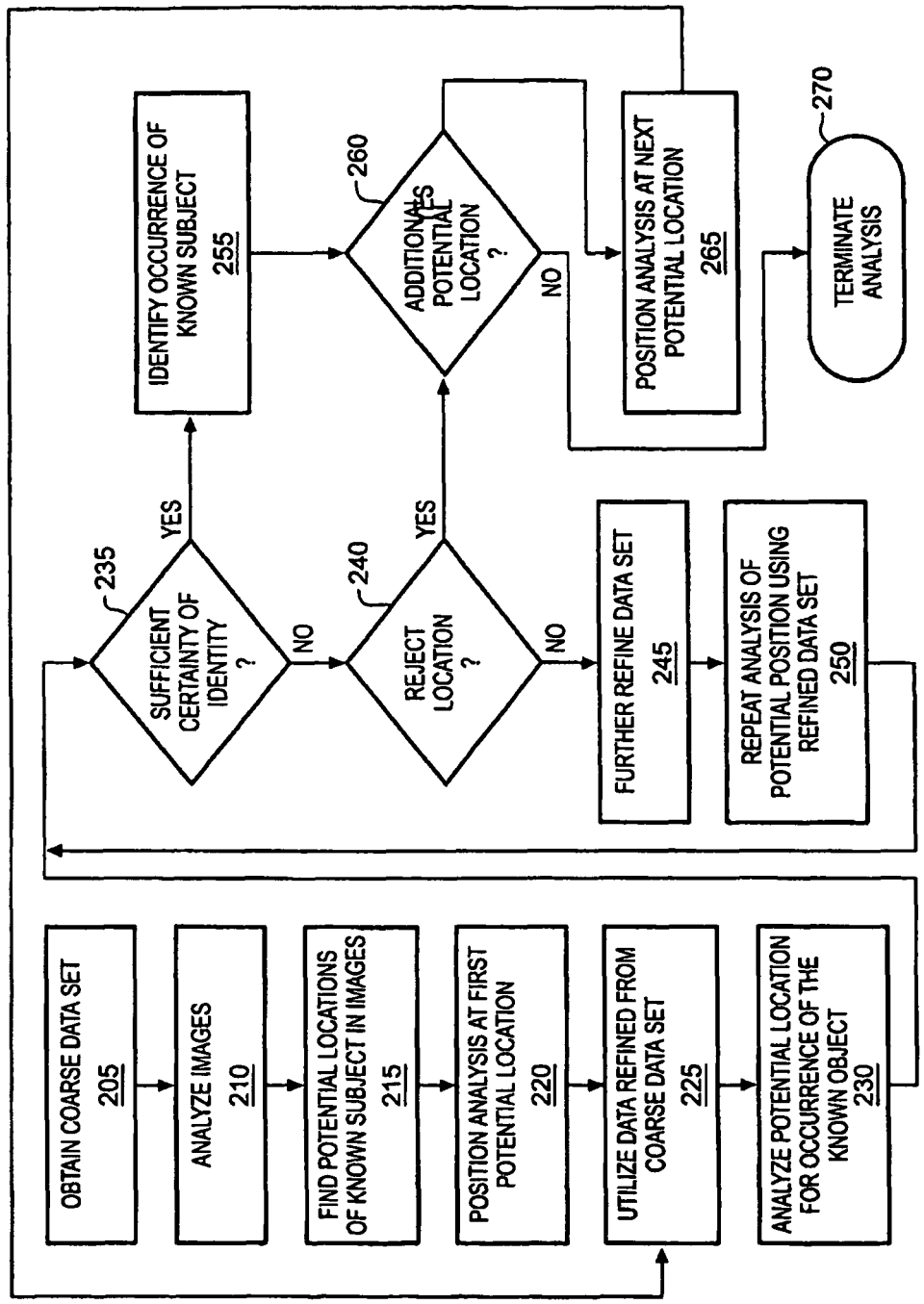
FIG. 2 shows a flow chart illustrating an exemplary method of parameter-based analysis of a set of images.

A coarse-to-fine analysis process may be used (FIG. 2). For example, the SPM imaging process may be conducted using a coarse-to-fine strategy, where the majority of an image field is rapidly scanned at low resolution, with real-time monitoring of the data. In locations where the low-resolution scanning detects the possible presence of a subject, the SPM instrument may be switched to high-resolution scanning. The resulting image would consist of a mixture of low and high-resolution data. This would greatly decrease the amount of time required to scan an entire SPM field for the presence of subjects.

Another non-limiting example concerning a coarse-to-fine process for data analysis is illustrated in FIG. 2. In this example, high-resolution images of one or more subjects may be analyzed using a coarse-to-fine strategy. As shown in FIG. 2, starting with a coarse data set 205, the fused posterior distribution of parameters 145 is analyzed for one or more images 210 to detect potential locations of known subjects 215. The data set about the potential locations is then analyzed with increasing degrees of refinement until the subject is identified with a sufficient degree of certainty. The degree of certainty may be selected by the operator, or may be predetermined. Once the potential locations of known subjects have been found 215, the analysis may proceed at each selected location. The analysis is directed to a first potential location 220 and the data is refined from the coarse data set 225 to produce a more refined data set. The refined data set is analyzed for the occurrence of a known subject 230.

The analysis of the refined data set 230 may indicate the presence of a known subject. The degree of certainty of the subject identification is then determined 235. A known subject may be identified with a sufficient degree of certainty 235 at the first location, in which case a positive identification of a known subject is indicated at that location 255. A determination is then made of whether additional potential locations remain to be analyzed 260. If so, the analysis will be positioned at the next potential location 265 and the process repeated, starting with the refinement of the coarse data set 225. If no additional potential locations remain to be analyzed, the analysis is terminated 270.

The analysis of the refined data set 230 may indicate the absence of a known subject, or it may indicate the presence of a known subject with an insufficient degree of certainty. In this case, a determination is made whether to reject the location 240. If the location is not rejected, then the data set is further refined 245 and the analysis is repeated using the more refined data set 250. If the location is rejected, then a determination is made of whether additional potential locations remain to be analyzed 260. The analysis is terminated 270 when all potential locations have either been analyzed at the maximum degree of refinement or rejected.

In one non-limiting example, the potential location that appears to be the most probable location for the presence of a known subject may initially be analyzed. The remaining locations may then be analyzed in order of probability for a known subject.

FIG. 2 is a simplification of the analysis process for the purpose of illustration. Additional elements of the process may be followed and the elements may be executed in a different order than is shown in FIG. 2. FIG. 2 only illustrates an analysis to determine whether a particular known subject is present. In other alternatives a set of images may be analyzed for the presence of multiple different known subjects simultaneously.

Figure 3:
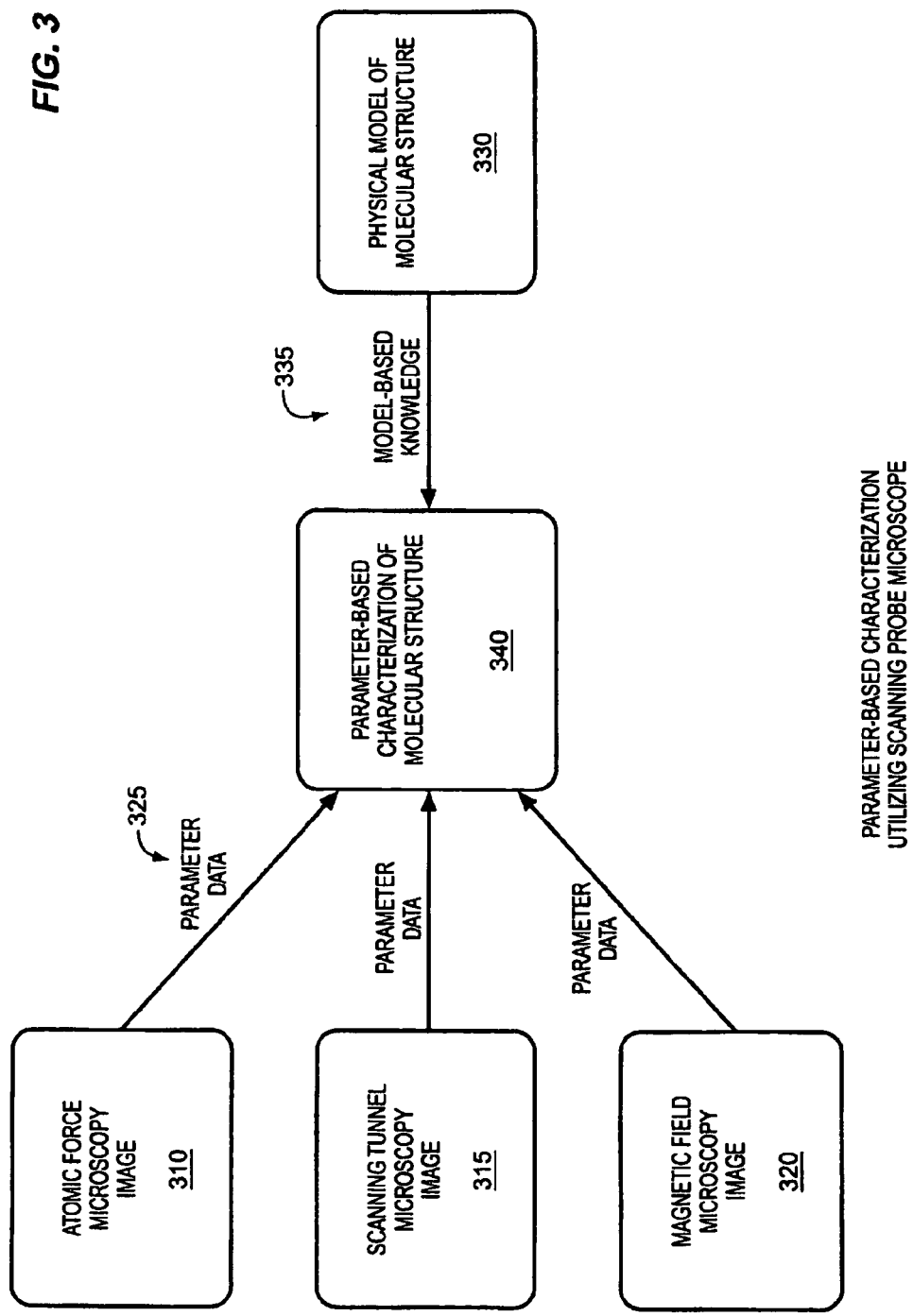
FIG. 3 illustrates an exemplary method for combining SPM images with a physical model of a molecular structure to form a parameter-based characterization of the structure.

FIG. 3 illustrates the formation of a parameter-based characterization of a molecular structure 340 utilizing images obtained by different modalities of a scanning probe microscope 310, 315, 320. The figure is illustrative only and additional or different SPM modalities may be used. As shown in FIG. 3, multiple images 310, 315, 320 of a molecular structure may be captured using different sensing modalities SPM. Data regarding parameters 325 may be derived for each of the images. In addition, a physical model of molecular structure 330 for one or more known subjects may provide model-based knowledge 335. The data 325 and the model-based knowledge 335 may be combined or fused to form a parameter-based characterization of the molecular structure 340. The characterization 340 formed then may be used to determine whether instances of specific molecular structures, such as a particular protein, peptide or nucleic acid sequence, are present in a sample.

Figure 4:
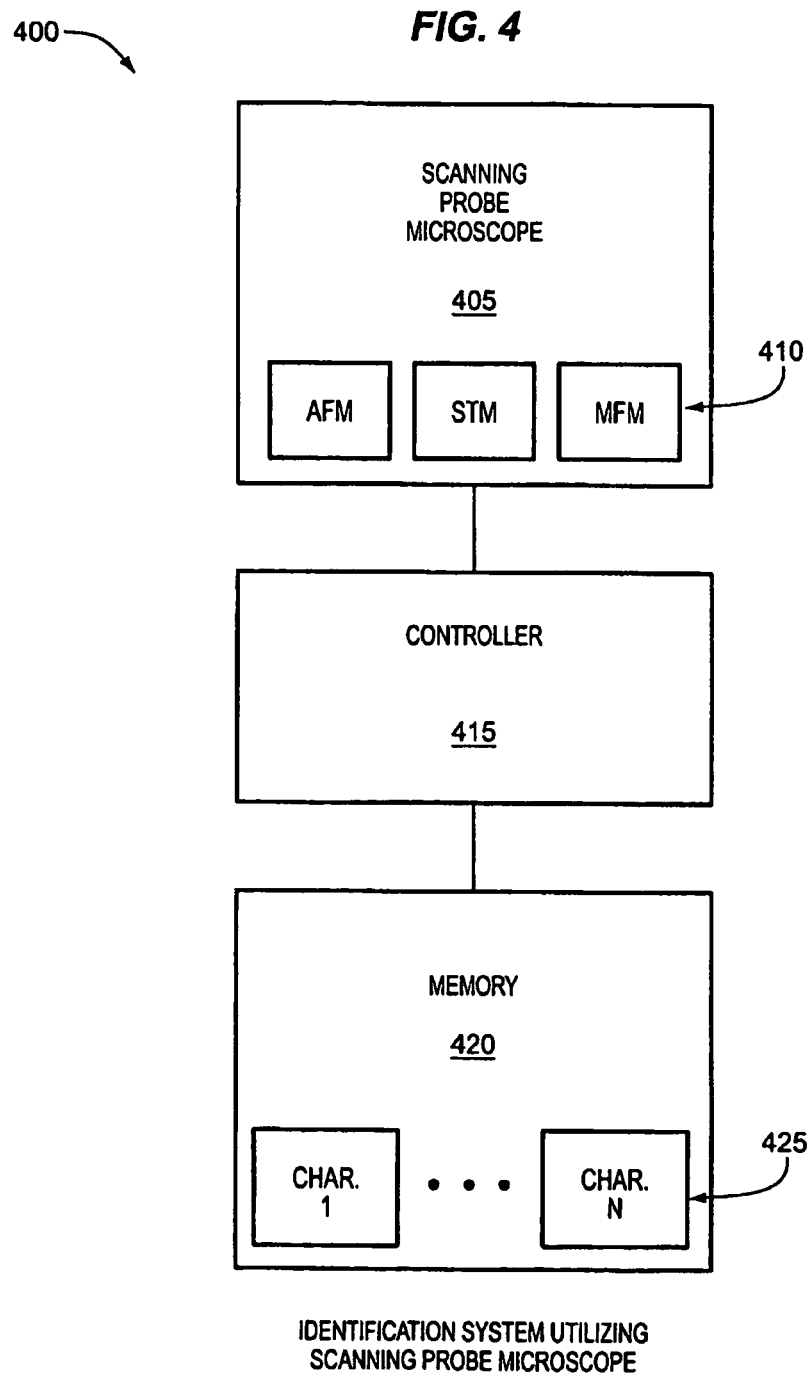
FIG. 4 illustrates an exemplary subject identification system utilizing SPM.

FIG. 4 illustrates a non-limiting example of a molecular structure identification system within the scope of the claimed subject matter. For purposes of clarity, FIG. 4 does not contain all components that may be included in such a system. The components shown in FIG. 4 may be comprised of multiple sub-components, or the functions of the illustrated components may be performed by other components or by a combination of components. As illustrated in FIG. 4, a system 400 may comprise a scanning probe microscope 405, a controller 415, and a memory 420. The scanning probe microscope 405 may have the capability of operating in two or more different sensing modalities 410. In FIG. 4 the sensing modalities are exemplified as atomic force microscopy (AFM), scanning tunnel microscopy (STM), and magnetic field microscopy (MFM). However, the modalities of use in the disclosed methods and apparatus are not limited to the examples. The controller 415 may control the operation of the system and may include a processor, feedback system and other elements.

The memory 420 may include one or more parameter-based characterizations of known molecular structures 425, shown in FIG. 4 as characterization 1 through characterization N 425. In an operation to determine whether a particular molecular structure is present in a sample, the controller 415 may direct the operation of the scanning probe microscope 405 utilizing appropriate sensing modalities 410 to obtain images of a sample. The images obtained may be analyzed and compared to the parameter-based characterizations of known molecular structures 425 contained in the memory 420 for the purpose of identifying any occurrences of known molecular structures in the sample.

Example 2

Substrate Preparation and Molecule Attachment

A variety of substrates may be used for imaging of biomolecules. Imaging is slow (on the order of minutes) and molecules move rapidly (fractions of seconds). Thus, in order to limit the molecular motions, samples may be absorbed onto the substrate and become part of the crystal lattice. The imaging of DNA by AFM using mica exemplifies this concept. DNA binds mica through the phosphate backbone using a divalent metal such as $Ni^{2+}$ or $Mg^{2+}$. DNA and mica are both negatively charged, and it is necessary to use a counterion such as $Mg^{2+}$ or $Ni^{2+}$ to adsorb DNA onto the mica (*Biophys. J.* 70:1933, 1996; PNAS 94:496, 1997; *Biochemistry* 36:461, 1997). The divalent cations work as a counterion on the negatively charged DNA backbone and also give additional charges to bind the mica. AP-mica (functionalized aminopropyl mica) has been used to bind DNA for AFM (*Proc. Natl. Acad. Sci. USA* 94:496, 1997).

Annealing Gold-on-Mica Substrates

A quartz capillary torch was made by pulling a piece of 1.00 mm o.d., 0.75 mm i.d. quartz capillary in a Sutter Instruments P-2000 capillary puller. The glass was scored and broken at a point where the capillary had an ID of about 200 μm. The surface was then lapped flat and polished using 3M imperial lapping film. Quartz discs were heated on a heating block at 130° C. for 5 minutes. The discs were flamed with a hydrogen torch using a 1.5 inch flame from the quartz tip. Fresh gold substrate was placed (butter side up) on the center of the disc using tweezers. The substrate was held down using a pre-flamed 1 cm×1 cm×1 mm quartz block which only touched the mica surface and was left to heat for 5 minutes. The quartz capillary torch was held at 30° to the plane of the disc, such that the tip of the flame just touched the gold surface. The flame was passed repetitively over the gold surface (45 times) using a two inch pass in one second cycles. The substrate was stored under argon in its original container until use.

DNA Deposition on Substrate

DNA was deposited on mica and scanned by AFM. A population of different size plasmid molecules (differing by 1,000 bases in length) ranging from 1-10 Kb was used and AFM images were obtained (not shown).

Example 3

STM Imaging

Gold Nanoparticles

AFM images were obtained with gold nanoparticles and lambda DNA. The substrates used were a poly L-lysine coated glass cover slip and amino-treated mica (AP-mica). AP-mica was obtained by vapor phase treatment of freshly cleaved mica with 3-aminopropyltriethoxy silane). Gold nanoparticles of 50 nm, 10 mm, 5 nm and 2 nm were purchased from Ted-pella Inc. (Redding, Calif.). With a poly L-lysine coverslip substrate, 10 μl of gold colloidal solution was left to dry on the coverslip. With AP-mica, 100 μl of gold colloidal solution was placed on the substrate for 15 min. Excess solution was then wicked off with a Kimwipe. AFM imaging of the AP-mica substrate, using a Digital Instruments NanoScope® in tapping mode AFM, showed a smooth, featureless surface. The AP-mica was a good surface for immobilizing gold nanoparticles. The 50 nm gold nanoparticles were easily imaged by AFM (not shown). The 5 and 10 nm gold nanoparticles were also clearly visible by AFM (not shown). The 2 nm gold nanoparticles were individually distinguishable, although the image resolution was not as sharp as with larger nanoparticles (not shown).

It was possible to distinguish between different sized nanoparticles in a mixture of 10, 5 and 2 nm gold nanoparticles (not shown). The 2 and 5 nm nanoparticles could be distinguished by the measured height using tapping mode AFM. These results show that SPM labels based upon different sized nanoparticles may be distinguished by SPM imaging techniques.

In another non-limiting example, 20 μl of poly-L-lysine solution (0.01% from Sigma Chemicals, St. Louis, Mo.) was placed onto a mica substrate for about 5 minutes, then rinsed with nanopure water (18 MΩ) and dried under filtered $N_2$ gas. Gold nanoparticles (from Polysciences or Ted-Pella Inc.) were sonicated for 30 sec. A 25 μl sample of undiluted nanoparticles was placed onto the poly-L-lysine coated mica for about 10 min, then rinsed with nanopure water and dried under filtered $N_2$ gas. Images were obtained with a Digital Instruments NanoScope® in tapping mode AFM (not shown).

Figure 5:
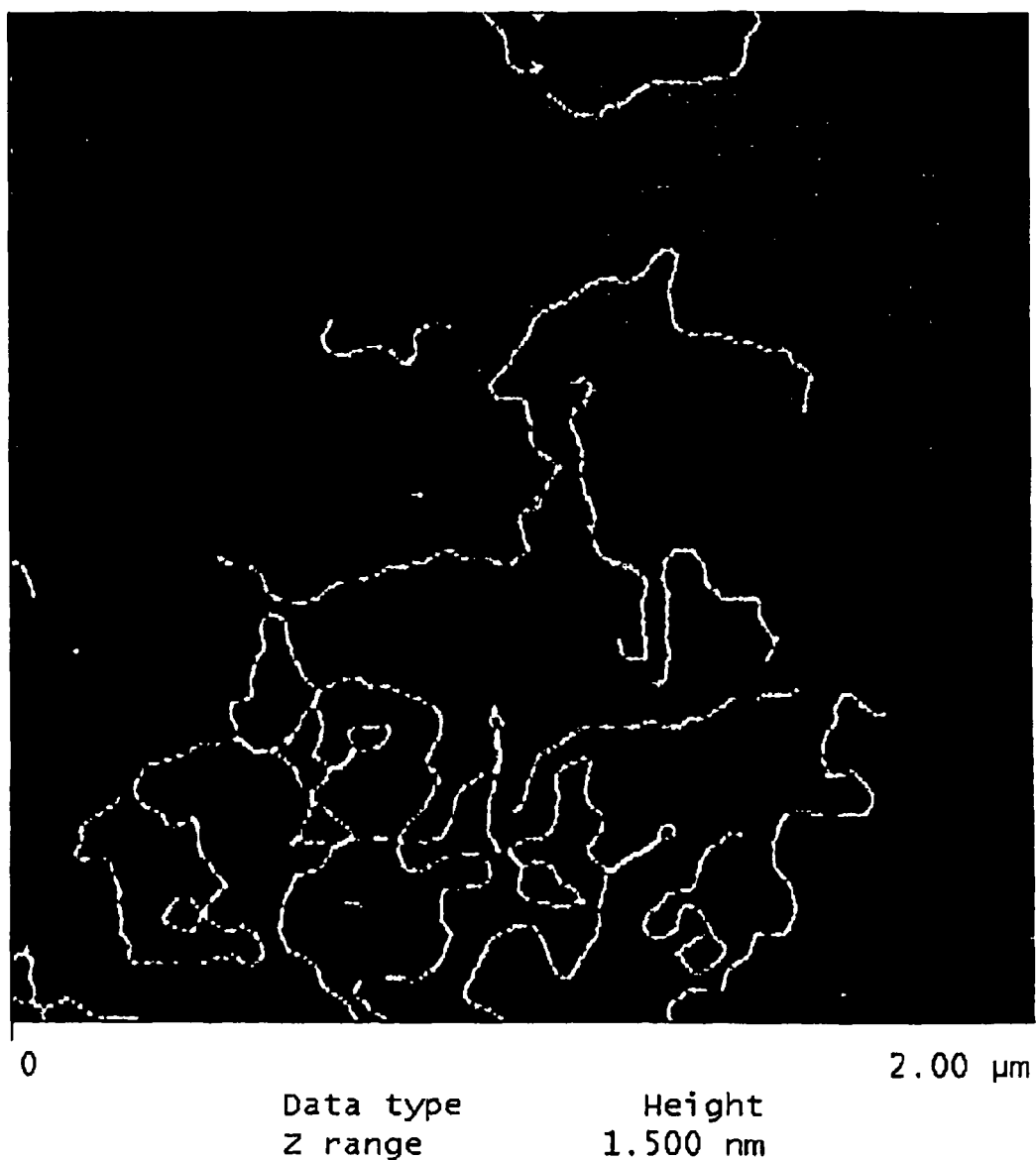
FIG. 5 shows an exemplary image of digested lambda DNA obtained by atomic force microscopy.

A Hind III digest of lambda DNA was also imaged by AFM. A 1 μg/ml solution of digested lambda DNA was prepared in HEPES buffer (40 mM HEPES, 5 mM NiCl, pH 6.8). A 30 μl sample of DNA solution was deposited onto a treated mica substrate for 10 min, rinsed with nanopure water and dried under N$_2$ gas. The AFM images of digested lambda DNA are shown in FIG. 5. The double-stranded DNA molecules are clearly visible by AFM imaging.

Fullerenes

An image of a single fullerene molecule deposited on a graphite surface was obtained by STM imaging, using a Digital Instruments NanoScope® with a 14.46 nm scan size (not shown). Multiple fullerenes were connected by peptides and imaged. Four fullerenes were attached to a peptide and an image was obtained by STM scanning, showing each of the four fullerenes (not shown).

Example 4

Alignment of Nucleic Acids

Lambda DNA was aligned by microfluidic molecular combing. A microfluidic channel was prepared in a layer of PDMS overlaying a substrate. Microfluidic channels were made by molding polydimethylsiloxane (PDMS) according to Anderson et al. ("Fabrication of topologically complex three-dimensional microfluidic systems in PDMS by rapid prototyping," *Anal. Chem.* 72:3158-3164, 2000). The substrate may comprise, for example, AP-mica or a gold coated substrate prepared as discussed above. A sample may be introduced into a chamber at one end of a microfluidic channel and a vacuum applied to a reservoir at the other end of the channel. The addition of one or more posts within the channel allows for molecule alignment by molecular combing. The PDMS layer is removed and the substrate rinsed with nanopure water and dried with N$_2$ gas. Various alignments may be formed using multiple chambers and/or microfludic channels, different patterns of microfludic components, different microfluidic streams and different structures within the channels.

Figure 6:
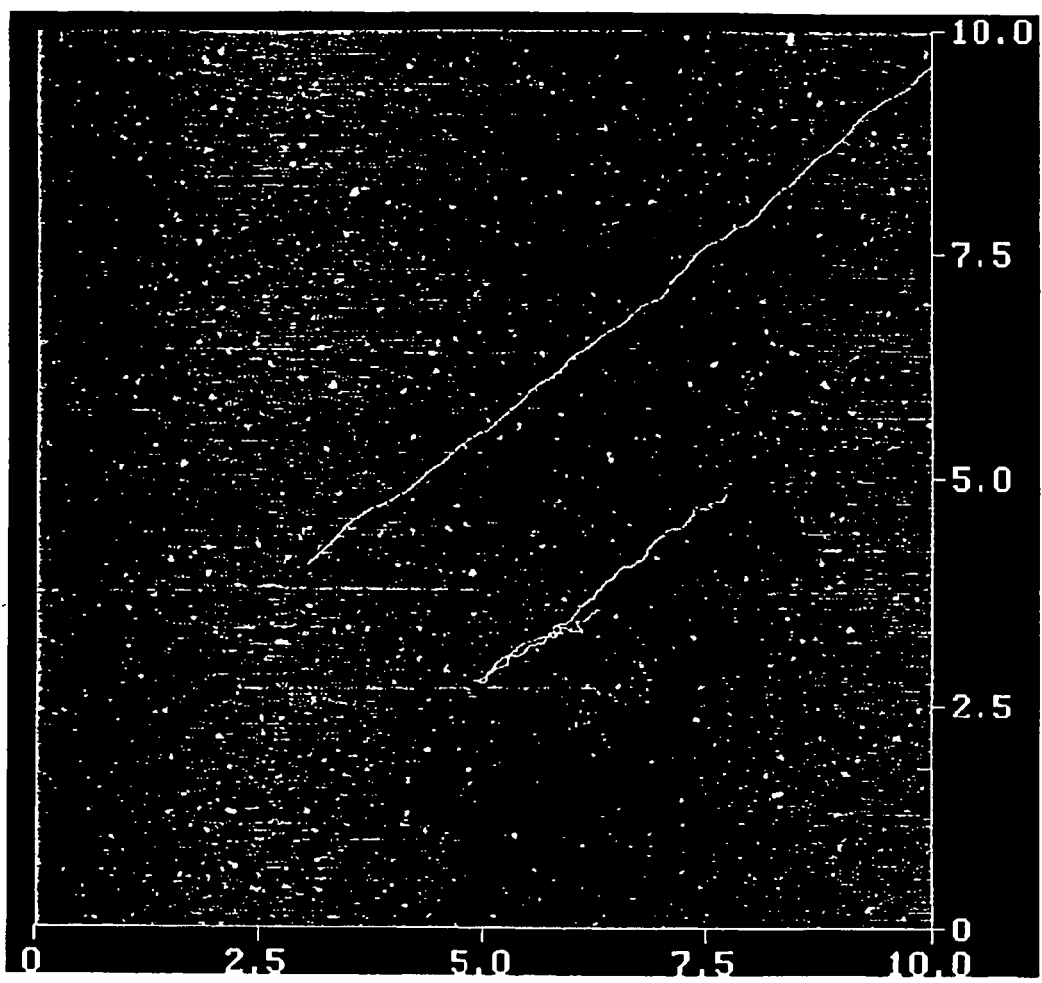
FIG. 6 shows an example of DNA molecules aligned by microfluidic molecular combing (MMC).
Figure 7:
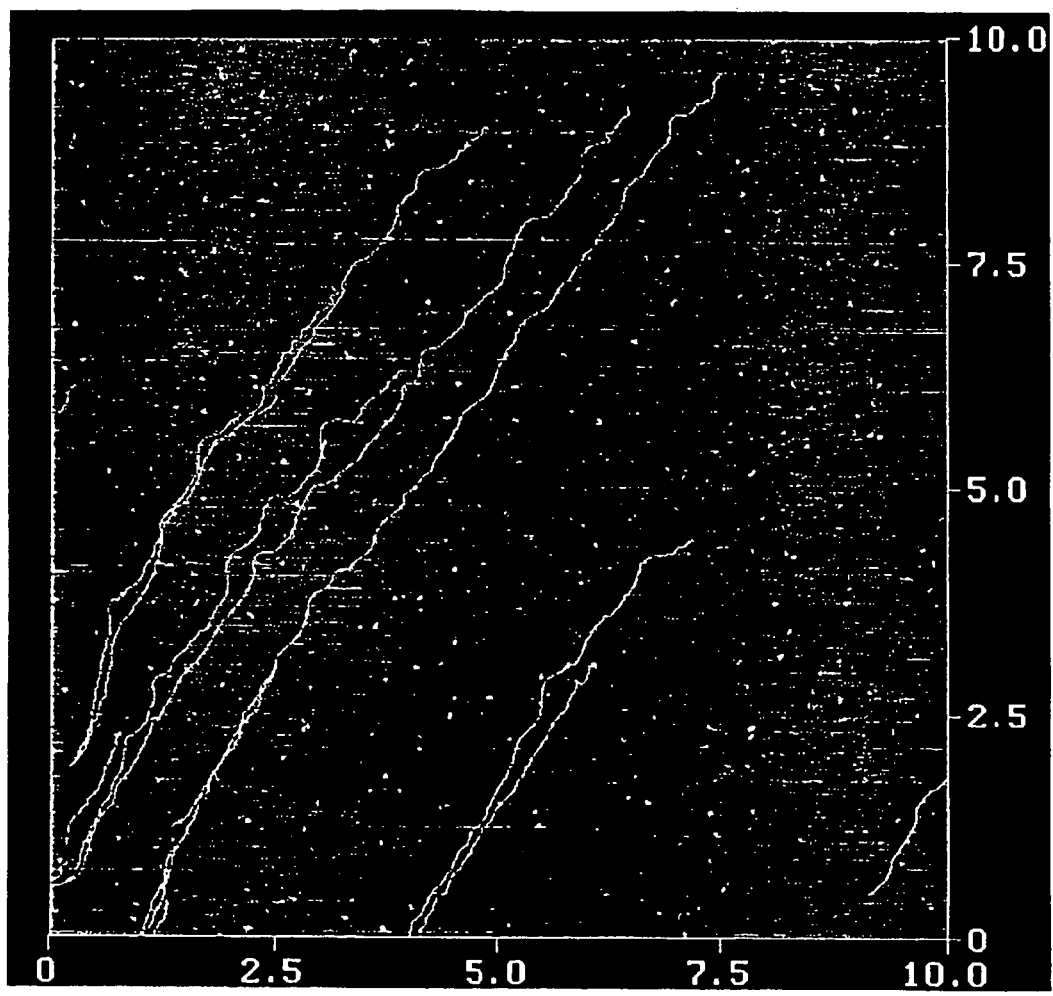
FIG. 7 shows another example of DNA molecules aligned by microfluidic molecular combing (MMC).

FIG. 6 and FIG. 7 show examples of lambda DNA molecules, aligned by the MMC process. The fully stretched and aligned lambda DNA was about 17 μm in length. Molecules were aligned parallel to the direction of microfluidic flow, as expected. This result demonstrates the feasibility of aligning molecules on a surface. The alignment of the molecules facilitates their imaging and identification by SPM imaging techniques.

Example 5

AFM Imaging of Oligonucleotide Based SPM Probe

Figure 8:
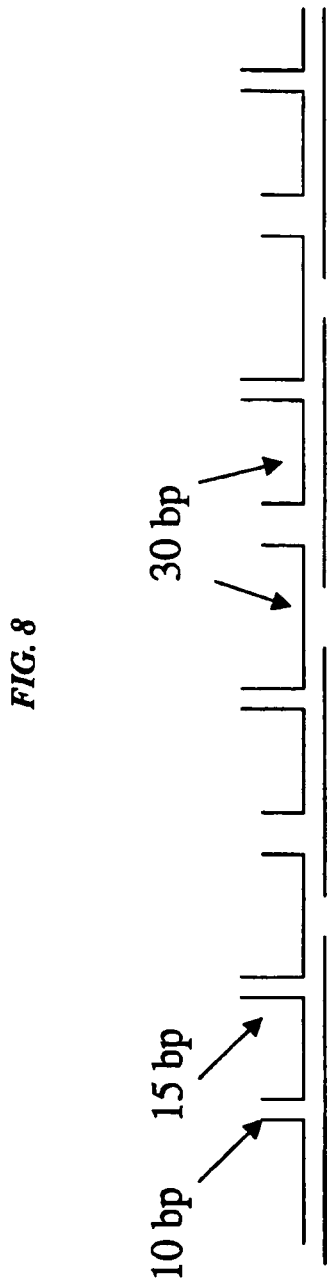
FIG. 8 illustrates an exemplary oligonucleotide based SPM probe made up of 13 individual oligonucleotide strands hybridized together.
Figure 9:
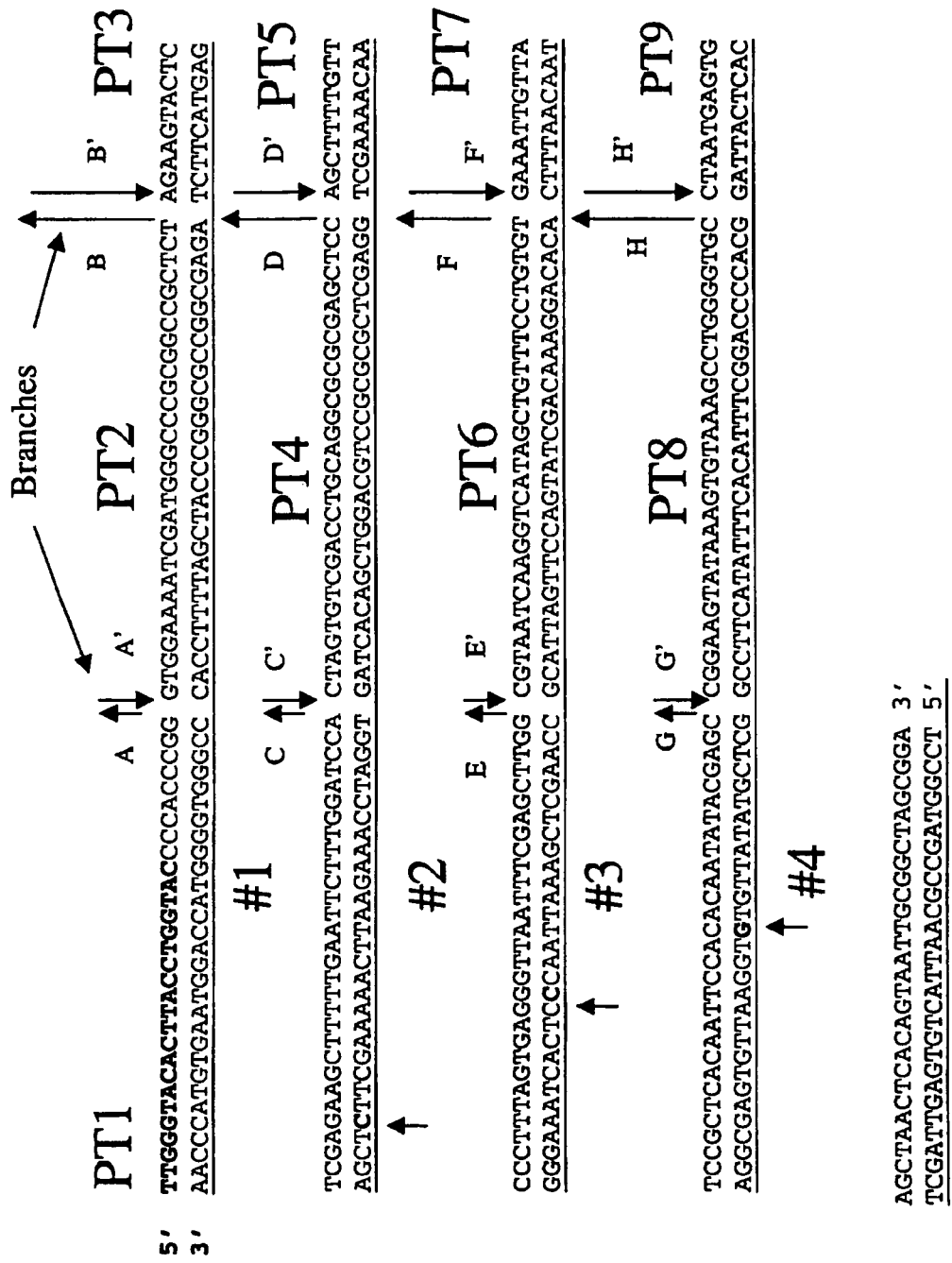
FIG. 9 shows the individual oligonucleotide components of the SPM probe of FIG. 8. Note that, as shown in FIG. 8, there are 9 fragments (labeled PT1 to PT9, in order) used to make the top strand of the SPM probe and 4 fragments (labeled #1 to #4) used to make the bottom strand. The hybridized SPM probe exhibits branch points detectable by scanning probe microscopy.

In a non-limiting example, SPM probes may be produced as a set of short oligonucleotide sequences hybridized together, as illustrated in FIG. 8. Each line in the Figure represents a single synthetic oligonucleotide, 9 on the top strand and 4 on the bottom strand. Hybridization creates branch points that may be imaged by SPM techniques. Alternatively, the branch points may serve as attachment sites for metal nanoparticles or other tag elements, as discussed above. An exemplary oligonucleotide probe sequence is provide in FIG. 9, showing the sequences of the top and bottom strands hybridized to each other. For clarity, the branch sequences are not shown in FIG. 9. FIG. 10 shows the complete sequences of the 9 separate oligonucleotides that form the top strand of the coded probe. The portions that hybridize to each other to form branch sites are indicated. For example, the 3' end of PT1 (SEQ ID NO:1), labeled "A", hybridizes to the 5' end of PT2 (SEQ ID NO:2), labeled "A'". Similarly, B binds to B', C binds to C", etc.

Figure 11:
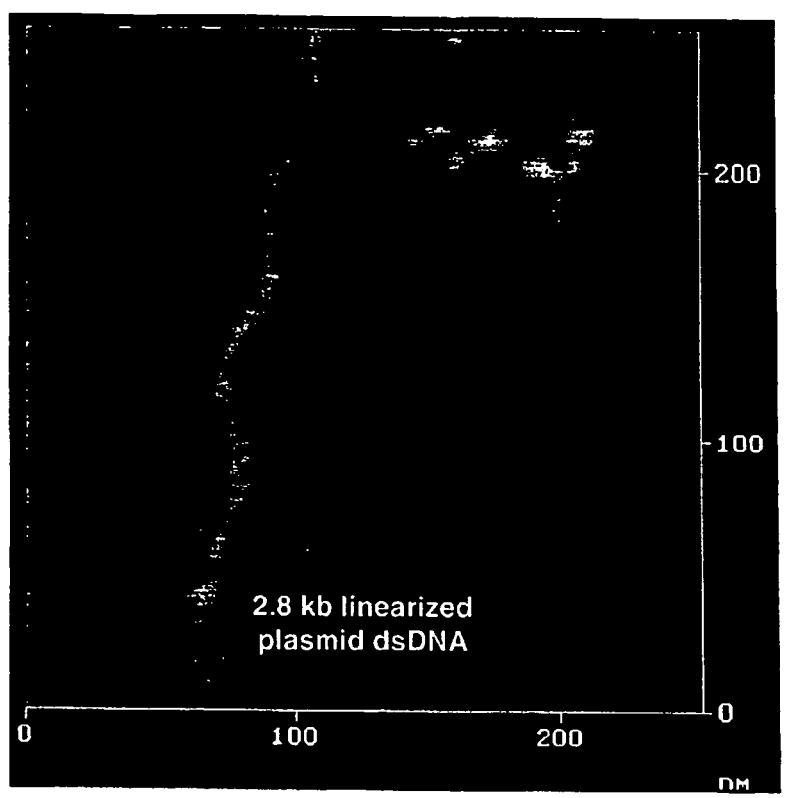
FIG. 11 shows the SPM probe of FIG. 8 and FIG. 9, imaged by atomic force microscopy (arrow, top right of Figure). For comparison, a 2.8 kb linearized plasmid DNA is also shown.

The exemplary coded probe was imaged by AFM techniques as discussed above. An AFM image of the coded probe is indicated by the arrow in FIG. 11. For comparison, a linearized 2.8 kb plasmid double-stranded DNA molecule is shown adjacent to the coded probe.

Those skilled in the art will recognize that the claimed methods and apparatus are not limited to the examples disclosed herein, but rather that modifications and changes may be made within the scope of the claimed subject matter. The specification and drawings are thus to be regarded as illustrative rather than limiting.

What is claimed is:

1. A method comprising:
   detecting using a processor a location of potential occurrence of a subject using a first data set at a first resolution obtained from scanning probe microscope (SPM) under a modality;
   producing a refined data set from the first data set at the location;
   determining presence or absence of the subject at the location using the refined data set; wherein nature or identity of the subject is known; and
   rescanning the detected location and obtaining a second data set at a second resolution from SPM under the modality, the second resolution being higher than the first resolution at the detected location.

2. The method of claim 1, wherein the location is detected while the first data set is obtained.

3. The method of claim 1, wherein the location is detected based on a fused posterior distribution of parameters.

4. The method of claim 3, wherein the location is detected based on a comparison of the fused posterior distribution of parameters with parameter ranges obtained from subjects whose nature or identity is known.

5. The method of claim 1, wherein the subjects are biomolecules.

6. The method of claim 5, wherein the subjects are proteins and/or nucleic acids.

7. The method of claim 1, further comprising identifying the subject using the refined data set when the subject is determined to be present.

8. The method of claim 1, wherein the SPM modality is selected from a group consisting of AFM, STM and MFM.

9. A device configured to identify molecular structures on a surface, comprising:
   a scanning probe microscope (SPM) with a plurality of imaging modalities configured to obtain data including one or more properties of the molecular structures by at least two different modalities;
   a controller configured to control the scanning probe microscope;
   a memory having one or more characterizations of molecular structures stored therein, wherein nature or identity of the molecular structures are known; and
   a microprocessor configured to detect a location of potential occurrence of a subject using a data set at a first resolution obtained by the SPM under a modality from scanning the surface, produce a refine data set from the data set at the location, determine presence or absence of the subject at the location using the refined data set; wherein nature or identity of the subject is known, and rescan the detected location and obtaining a second data set at a second resolution by the SPM under the modality, the second resolution being higher than the first resolution at the detected location.

10. The device of claim 9, wherein the molecular structures are aligned in a parallel manner by molecular combing prior to analysis.

11. The device of claim 9, wherein the microprocessor is further configured to identify the subject using the refined data set when the subject is determined to be present.

12. A method comprising: obtaining scanning probe microscope (SPM) imaging data at a first resolution from a surface; monitoring the SPM imaging data while the SPM imaging data at a first resolution are obtained; identifying one or more locations on the surface based on the SPM imaging data at the first resolution; obtaining SPM imaging data at a second resolution at the one or more locations, wherein the second resolution is higher than the first resolution; wherein the SPM image data at the first resolution and the SPM image data at the second resolution have the same modality.

13. A method comprising:
   analyzing a set of SPM images utilizing a processor a coarse data set at a first resolution obtained from SPM under a modality to detect locations of potential occurrences of one or more subjects;
   producing a refined data set from the coarse set at the detected locations; and
   analyzing the refined data set;
   rescanning the detected locations and obtaining images at a second resolution from SPM under the modality, the second resolution being higher than the first resolution.

14. The method of claim 13, further comprising utilizing a learning machine to recognize various types of biomolecules by their similarity to biomolecule structures whose nature or identity is known.

* * * * *

SEQUENCE LISTING

```
<160> NUMBER OF SEQ ID NOS: 13

<210> SEQ ID NO 1
<211> LENGTH: 40
<212> TYPE: DNA
<213> ORGANISM: Artificial
<220> FEATURE:
<223> OTHER INFORMATION: Synthetic Oligonucleotides

<400> SEQUENCE: 1
ttgggtacac ttacctggta ccccacccgg agttaggggc                          40

<210> SEQ ID NO 2
<211> LENGTH: 60
<212> TYPE: DNA
<213> ORGANISM: Artificial
<220> FEATURE:
<223> OTHER INFORMATION: Synthetic Oligonucleotides

<400> SEQUENCE: 2
gcccctaact gtggaaaatc gatgggcccg cggccgctct tatggttgct gactagacca    60

<210> SEQ ID NO 3
<211> LENGTH: 70
<212> TYPE: DNA
```

```
<213> ORGANISM: Artificial
<220> FEATURE:
<223> OTHER INFORMATION: Synthetic Oligonucleotides

<400> SEQUENCE: 3
tggtctagtc agcaaccata agaagtactc tcgagaagct ttttgaattc tttggatcca    60
tggggcggag                                                           70

<210> SEQ ID NO 4
<211> LENGTH: 60
<212> TYPE: DNA
<213> ORGANISM: Artificial
<220> FEATURE:
<223> OTHER INFORMATION: Synthetic Oligonucleotides

<400> SEQUENCE: 4
ctccgcccca ctagtgtcga cctgcaggcg cgcgagctcc aatgggcgga caatggcaca    60

<210> SEQ ID NO 5
<211> LENGTH: 70
<212> TYPE: DNA
<213> ORGANISM: Artificial
<220> FEATURE:
<223> OTHER INFORMATION: Synthetic Oligonucleotides

<400> SEQUENCE: 5
tgtgccattg tccgcccatt agcttttgtt ccctttagtg agggttaatt tcgagcttgg    60
attgagatgc                                                           70

<210> SEQ ID NO 6
<211> LENGTH: 60
<212> TYPE: DNA
<213> ORGANISM: Artificial
<220> FEATURE:
<223> OTHER INFORMATION: Synthetic Oligonucleotides

<400> SEQUENCE: 6
gcatctcaat cgtaatcaag gtcatagctg tttcctgtgt ttgcatactt ctgccattcg    60

<210> SEQ ID NO 7
<211> LENGTH: 70
<212> TYPE: DNA
<213> ORGANISM: Artificial
<220> FEATURE:
<223> OTHER INFORMATION: Synthetic Oligonucleotides

<400> SEQUENCE: 7
cgaatggcag aagtatgcaa gaaattgtta tccgctcaca attccacaca atatacgagc    60
tgctggggag                                                           70

<210> SEQ ID NO 8
<211> LENGTH: 60
<212> TYPE: DNA
<213> ORGANISM: Artificial
<220> FEATURE:
<223> OTHER INFORMATION: Synthetic Oligonucleotides

<400> SEQUENCE: 8
ctccccagca cggaagtata aagtgtaaag cctggggtgc ggatgggcgg aatgagactg    60

<210> SEQ ID NO 9
<211> LENGTH: 61
<212> TYPE: DNA
<213> ORGANISM: Artificial
```

```
<220> FEATURE:
<223> OTHER INFORMATION: Synthetic Oligonucleotides

<400> SEQUENCE: 9
acagtctcat tccgcccatc cctaatgagt gagctaactc acagtaattg cggctagcgg      60
a                                                                     61

<210> SEQ ID NO 10
<211> LENGTH: 74
<212> TYPE: DNA
<213> ORGANISM: Artificial
<220> FEATURE:
<223> OTHER INFORMATION: Synthetic Oligonucleotides

<400> SEQUENCE: 10
aacccatgtg aatggaccat ggggtgggcc caccttttag ctacccgggc gccggcgaga      60
tcttcatgag agct                                                       74

<210> SEQ ID NO 11
<211> LENGTH: 78
<212> TYPE: DNA
<213> ORGANISM: Artificial
<220> FEATURE:
<223> OTHER INFORMATION: Synthetic Oligonucleotides

<400> SEQUENCE: 11
cttcgaaaaa cttaagaaac ctaggtgatc acagctggac gtccgcgcgc tcgaggtcga      60
aaacaaggga aatcactc                                                   78

<210> SEQ ID NO 12
<211> LENGTH: 74
<212> TYPE: DNA
<213> ORGANISM: Artificial
<220> FEATURE:
<223> OTHER INFORMATION: Synthetic Oligonucleotides

<400> SEQUENCE: 12
ccaattaaag ctcgaaccgc attagttcca gtatcgacaa aggacacact ttaacaatag      60
gcgagtgtta aggt                                                       74

<210> SEQ ID NO 13
<211> LENGTH: 84
<212> TYPE: DNA
<213> ORGANISM: Artificial
<220> FEATURE:
<223> OTHER INFORMATION: Synthetic Oligonucleotides

<400> SEQUENCE: 13
gtgttatatg ctcggccttc atatttcaca tttcggaccc cacggattac tcactcgatt      60
gagtgtcatt aacgccgatg gcct                                            84
```